United States Patent
Iwao et al.

(10) Patent No.: US 7,100,960 B2
(45) Date of Patent: Sep. 5, 2006

(54) VISIBILITY ADJUSTING METHOD AND APPARATUS OF VEHICLE

(75) Inventors: Keijiro Iwao, Yokohama (JP); Mitsuhito Ito, Fujisawa (JP); Kenya Uenuma, Yokohama (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 14 days.

(21) Appl. No.: 10/846,560

(22) Filed: May 17, 2004

(65) Prior Publication Data

US 2004/0239141 A1    Dec. 2, 2004

(30) Foreign Application Priority Data

Jun. 2, 2003   (JP)   ............ P2003-156980
Oct. 6, 2003   (JP)   ............ P2003-347046

(51) Int. Cl.
*B60J 1/02* (2006.01)
(52) U.S. Cl. ............... 296/84.1; 296/96.19
(58) Field of Classification Search ............... 296/84.1, 296/96.19
See application file for complete search history.

(56) References Cited

U.S. PATENT DOCUMENTS 3,276,813 A * 10/1966 Shaw, Jr. ............... 296/96.19
4,555,434 A * 11/1985 Kunert ............... 428/194
5,172,100 A * 12/1992 Iino ............... 345/7

FOREIGN PATENT DOCUMENTS

JP    P2000-211355    8/2000

OTHER PUBLICATIONS

P.A. 84-429, S.36. Cited. 30 CA 263, 266, Conneticut Window Lint Law, http://home.pcisys.net/bpc/auto_law/tint/tint_ct.html.*
Cyberdriveillinois, Secretary of State Police, Frequently Asked Questions, Enforcement, http://www.cyberdriveillinois.com/departments/police/faq.html.*
Texas Department of Public Safety, Commercial Vehicle Enforcement, Glazing and Window Construction, http://www.txdps.state.tx.us/lw/cmvlaw/Misc/tint.asp.*

* cited by examiner

*Primary Examiner*—Dennis H. Pedder
(74) *Attorney, Agent, or Firm*—McDermott Will & Emery LLP

(57) ABSTRACT

According to a visibility adjusting apparatus of a vehicle, an apex T is disposed at a position deviated from a driver and between a position opposed to the driver and a vehicle center position, left and right ridgelines uniformly downwardly inclined from the apex T to the vehicle-width direction are set, and a visibility adjusting section is formed as a parting line which adjusts a lower end visibility of the windshield. The visibility adjusting section is formed of the apex and the left and right ridgelines. With this, a sense of balance of the driver can be stabilized by the inclined parting line, and the sway of a head inclination angle can be suppressed.

9 Claims, 22 Drawing Sheets

LINE OF VISION ANGLE CONSIDERING DEVIATION
OF DRIVER'S SEAT (LANE WIDTH 3.5m, OFFSET 0.5m)

HORIZONTAL LINE REFERENCE

HEAD COORDINATE REFERENCE

VISIBILITY ADJUSTING METHOD AND APPARATUS OF VEHICLE

BACKGROUND OF THE INVENTION

The present invention relates to a visibility adjusting method and an apparatus for adjusting a driver's forward visibility by providing a lower end of a windshield with a visibility adjusting section.

Conventionally, there is known a visibility adjusting method of a vehicle in which a lower end of a windshield is shielded, and the forward visibility is adjusted in accordance with a running state, thereby enhancing a forward visibility at driving as disclosed in Japanese Patent Application Laid-Open No. 2000-211355 for example.

In such a conventional visibility adjusting method, an actual vehicle speed and a distance between vehicles are detected, and these values are compared with corresponding values of a calculation method so that the visibility is limited when running on an expressway to prevent fatigue and sleepiness, and sufficient visibility is secured during medium and low speed running to prevent the driver from overlooking an obstacle existing immediately in front of the vehicle.

That is, if the visibility immediately in front of the vehicle is excessively excellent, the driver's nerve is worn and fatigue is increased. In order to prevent this, the height of the lower end of the windshield is changed in accordance with situation, thereby limiting the visible area.

In the conventional visibility adjusting method of a vehicle, however, a parting line of an upper end edge which shields the lower end of the windshield extends straightly in a vehicle-width direction. Therefore, when making a right turn on a curve, if coordinates are set on vertical and horizontal axes relative to gravity of earth as shown in FIG. 23A, the vehicle rolls to the left, and a head of the driver inclines to the right against a turning lateral acceleration. If the driver sees the scenery relative to the head coordinates at that time, the forward visibility rolls at an angle equal to or greater than a roll of the vehicle as shown in FIG. 23B.

At that time, the driver adjusts a head inclination angle so that a vector sum of acceleration of gravity and a turning lateral acceleration is directed into a direction near a head vertical axis. However, it is found that this position is not always stabilized and is varied. As a result of this variation, the driver's posture becomes unstable and with this, steering operation is disturbed, and this causes a vicious circle that this steering disturbance varies the turning lateral acceleration and the head inclination angle becomes further unstable.

The present inventors found that one of causes of sway of the head inclination angle is directional property of a window frame lower end line of the vehicle. That is, it is known that when one losses a horizontal degree of a reference line, he or she losses sense of balance. The present inventors have applied this to a vehicle and studied on this. As a result, it is confirmed that the sway of the window frame lower end line at the time of rolling visually disturbs the sense of balance and affects the head inclination angle.

Thereupon, the present invention has been accomplished while paying attention to the sense of balance of human, and the invention provides a visibility adjusting method and a visibility adjusting apparatus that can stabilize a sense of balance of a driver and suppress the sway of the head inclination angle by forming the parting line of the visibility adjusting section into a shape which is deviated from a straight line shape which can be seen as horizontal when running straightly, or by changing the parting line in accordance with turning condition such as a roll angle of a vehicle body.

SUMMARY OF THE INVENTION

To achieve the above object, the present invention provides a visibility adjusting method of a vehicle in which a windshield is provided at its lower end with a visibility adjusting section to adjust forward visibility of a driver, comprising the steps of: disposing an apex at a position deviated from the driver and between a position opposed to the driver and a vehicle center position; setting left and right ridgelines which uniformly incline downwardly from the apex toward opposite sides in a vehicle-width direction; and forming a visibility adjusting section by the apex and the left and right ridgelines as a parting line which adjusts a lower end visibility of the windshield.

According to the present invention, the parting line of the visibility adjusting section provided on the lower end of the windshield is uniformly and downwardly inclined from the apex disposed at a position deviated from the driver toward the opposite sides in the vehicle-width direction. Therefore, the sense of balance of the driver can be stabilized by this inclined parting line and the sway of the head inclination angle can be suppressed. Thus, the driver's posture is stabilized and the steering disturbance can be suppressed.

BRIEF DESCRIPTION OF THE DRAWINGS

FIGS. 14A to 14C are explanatory views showing shapes of a visibility adjusting section in the seventh embodiment of the invention, wherein FIG. 14A shows a case where a ridgeline is convex downwardly, FIG. 14B shows a case where the ridgeline is convex upwardly, and FIG. 14C shows a case where the ridgeline is convex downwardly and a left side of a flexion is upwardly inclined;

DETAILED DESCRIPTION OF THE PREFERRED EMBODIMENTS

Embodiments of the present invention will be explained below with reference to the drawings.

First Embodiment

Figure 1:
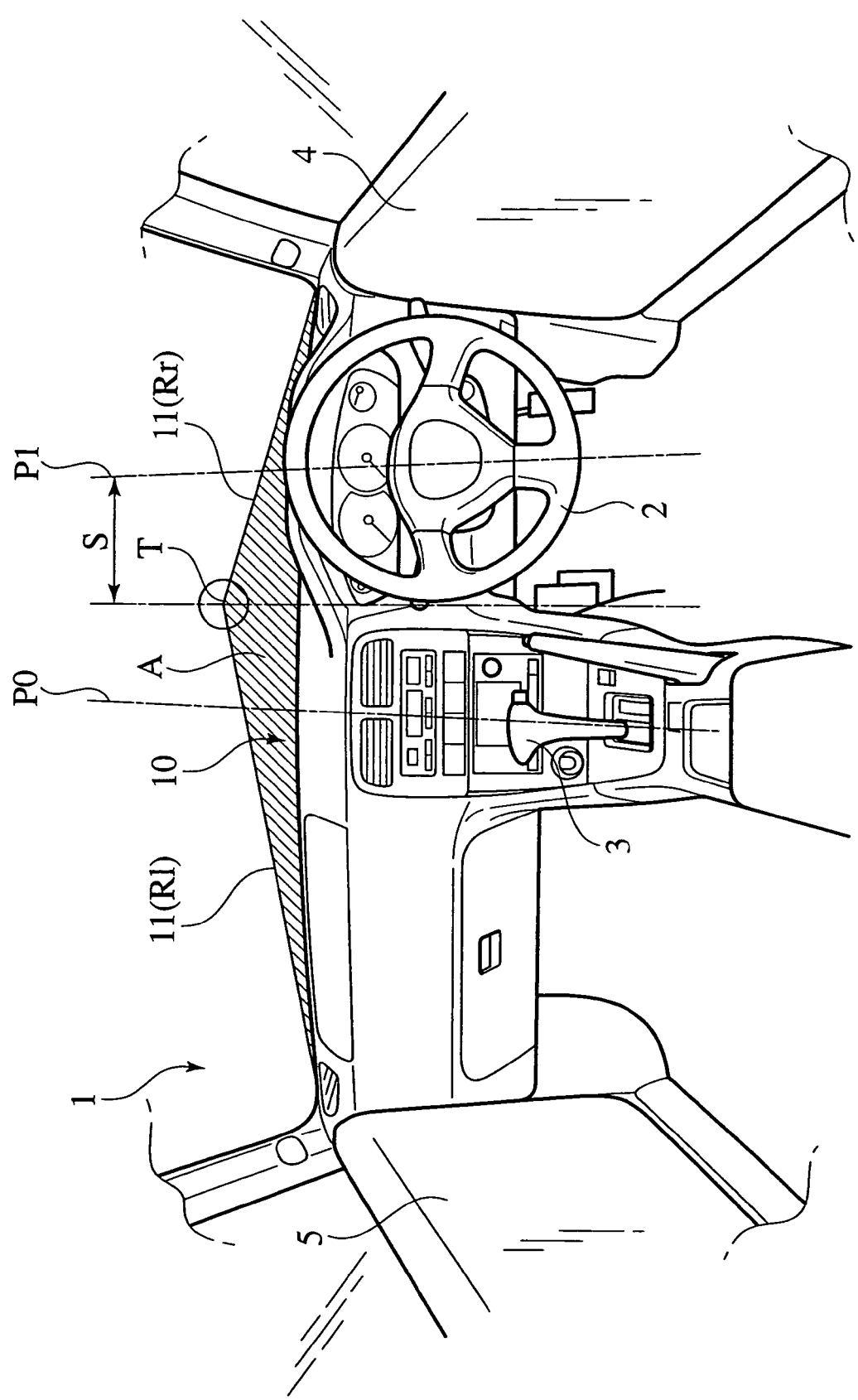
FIG. 1 is a perspective view of a vehicle as viewed forwardly from inside of the vehicle according to a first embodiment of the present invention.
Figure 2:
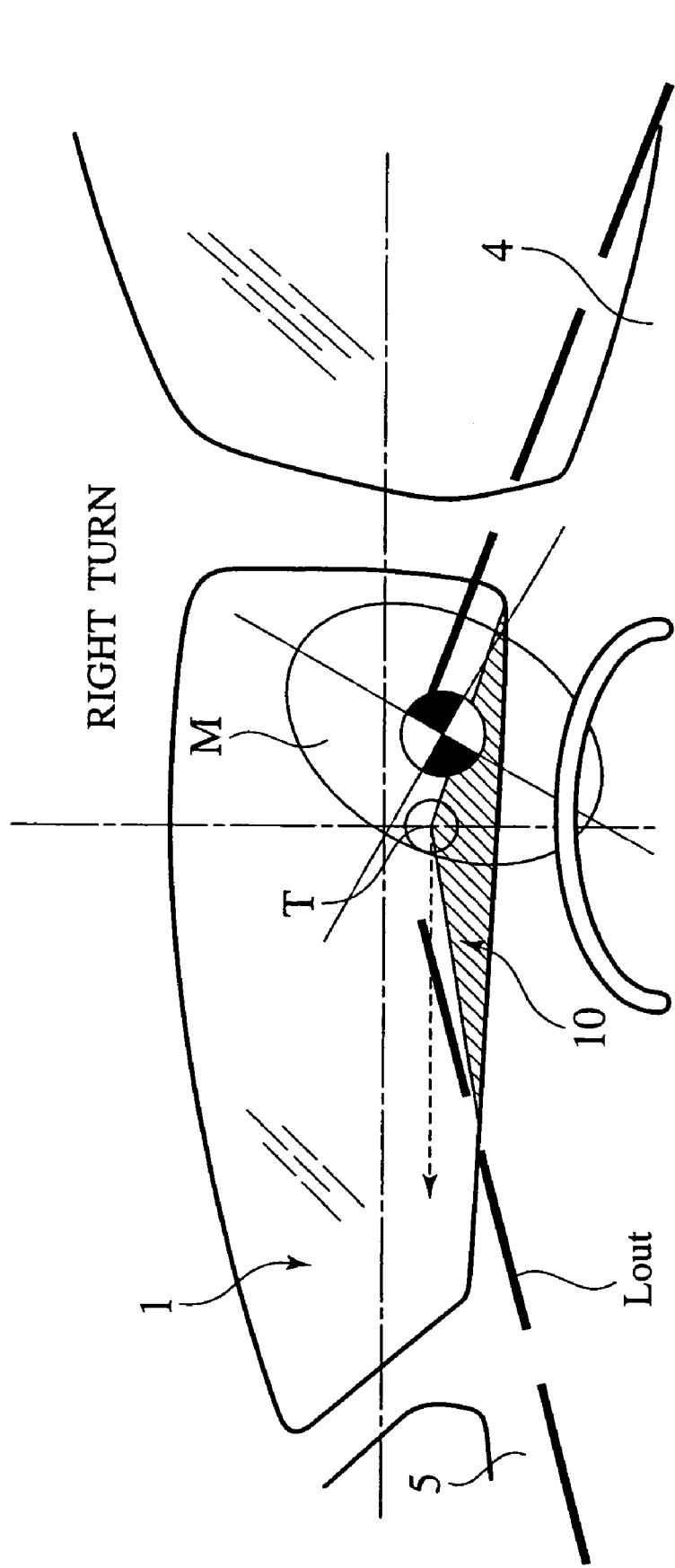
FIG. 2 is an explanatory view showing a relation between a parting line and forward visibility as viewed from a driver in the first embodiment of the invention.
Figure 3:
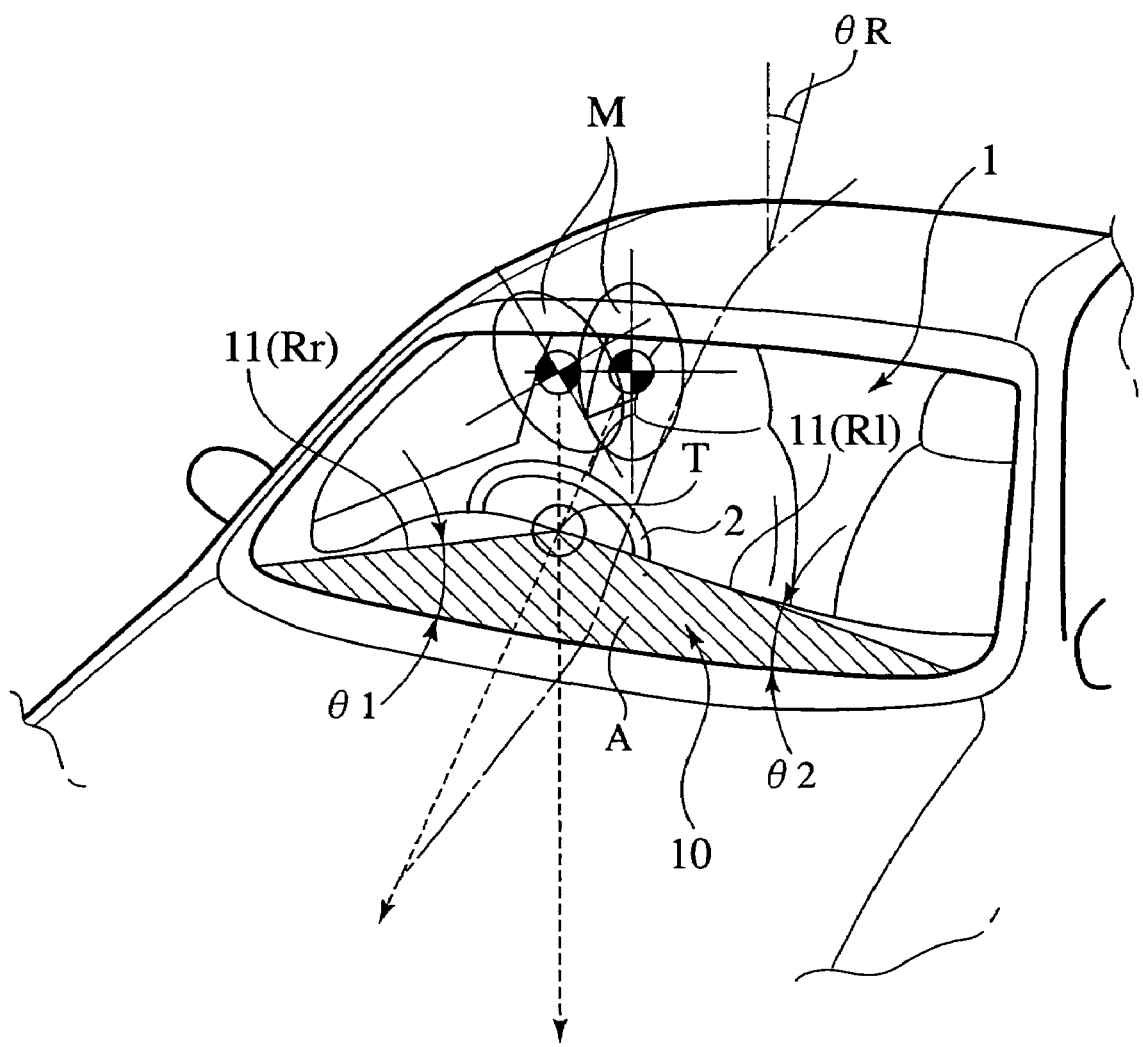
FIG. 3 is an explanatory view showing a relation between a line of vision of the driver and the apex of the parting line in the first embodiment of the invention.
Figure 4:
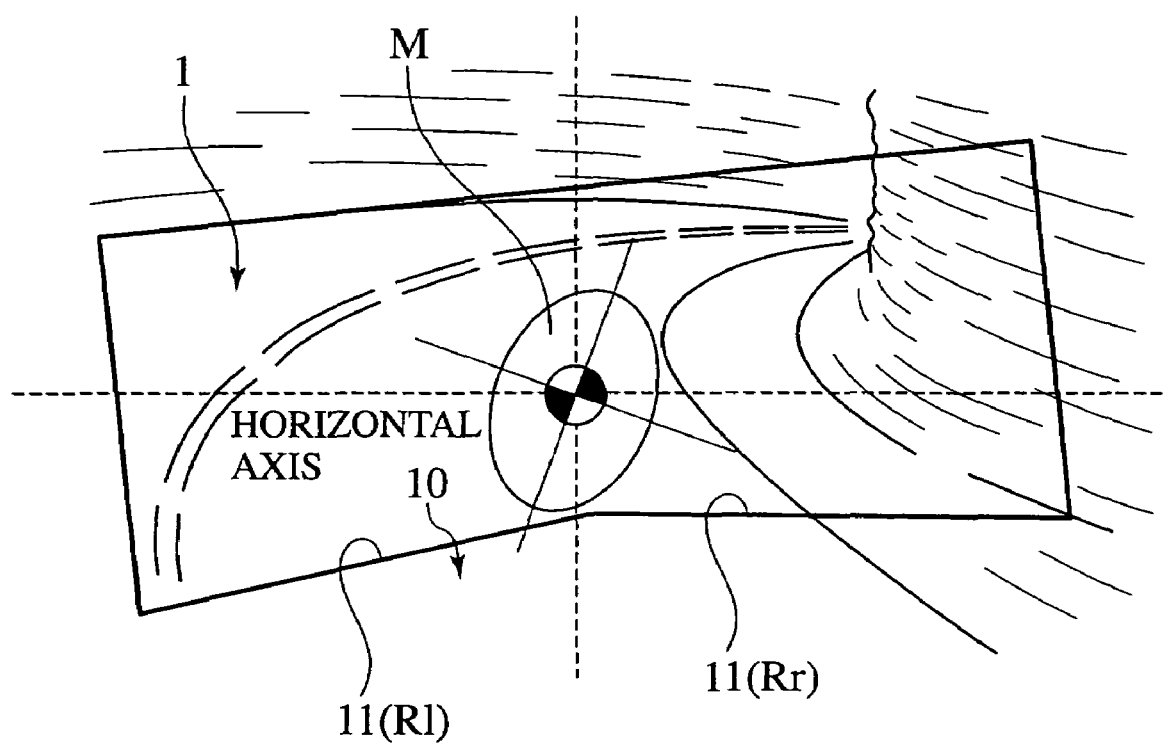
FIG. 4 is an explanatory view showing a forward visibility when making a right turn in the first embodiment of the invention.
Figure 5A:
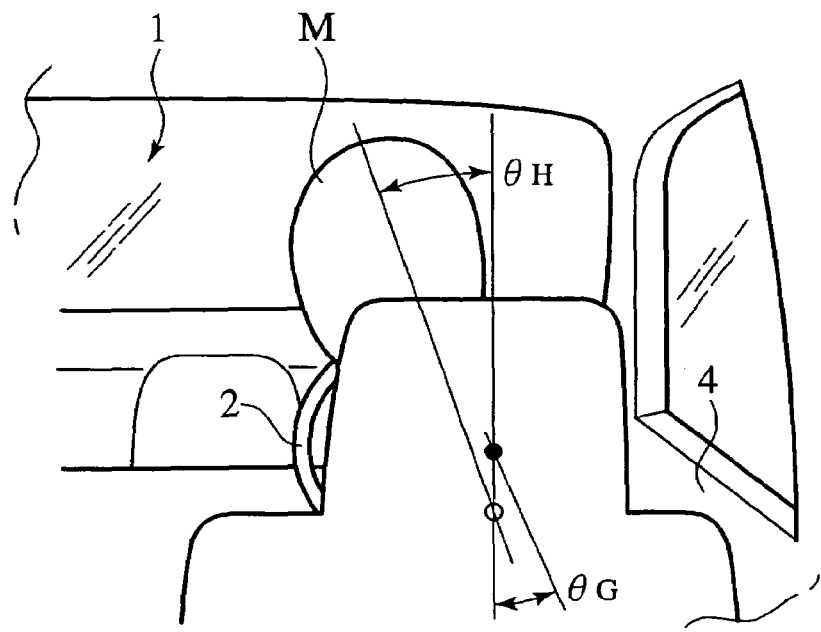
FIGS. 5A and 5B show a relation between a head angle and a pendulum angle when the vehicle turns in the first embodiment of the invention.
Figure 5B:
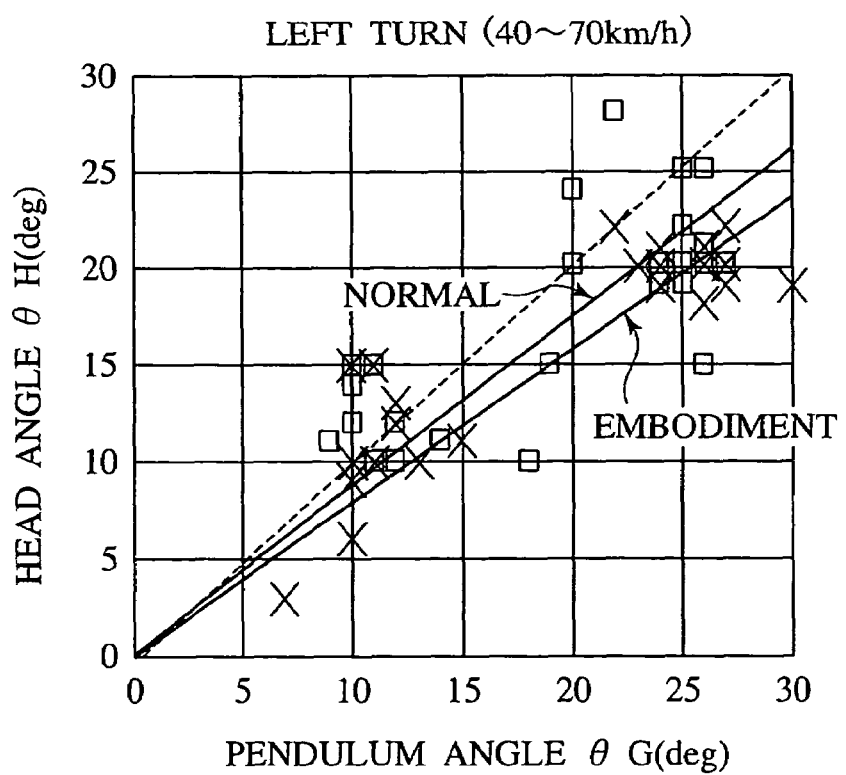
Figure 6:
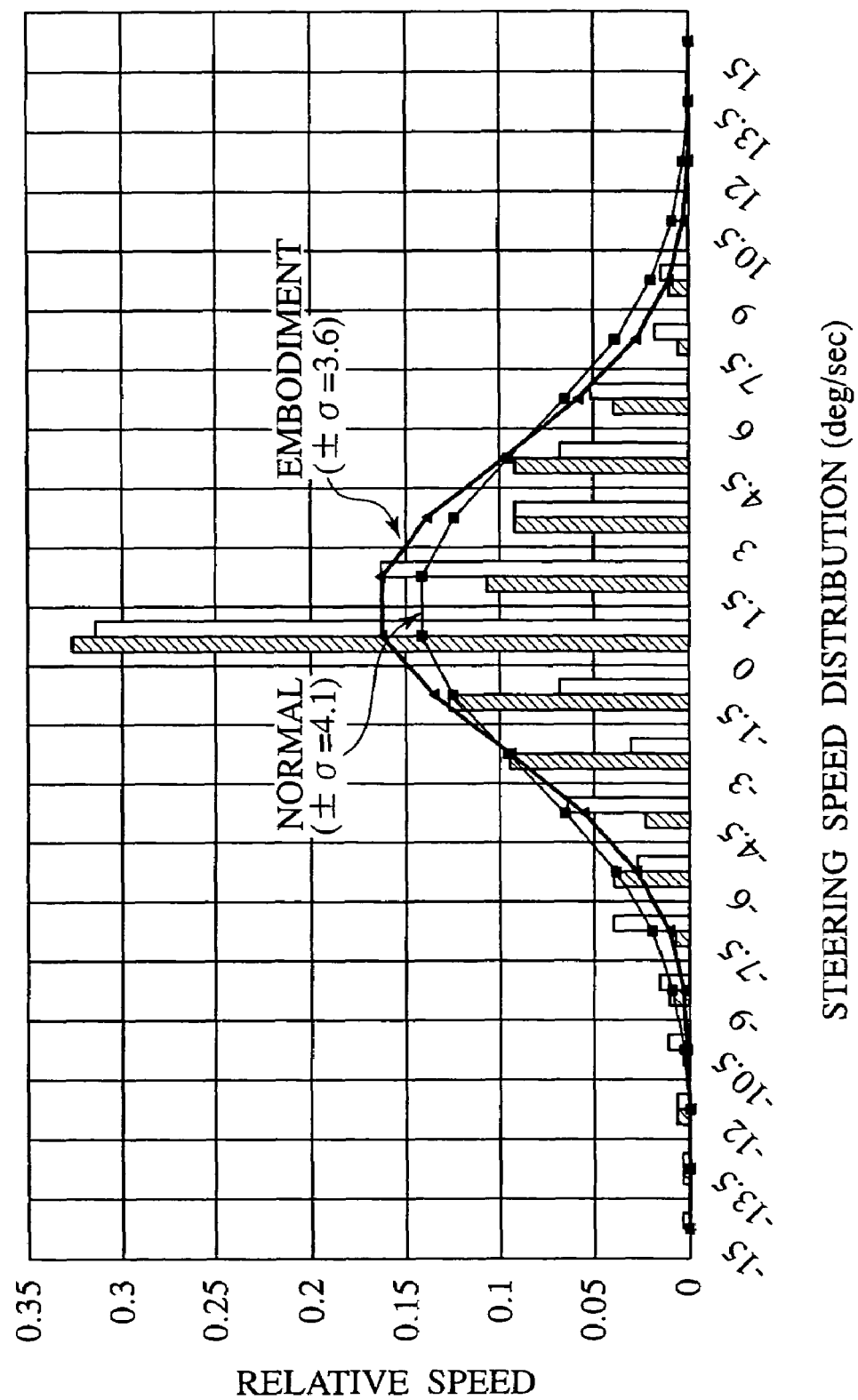
FIG. 6 is a graph showing a relation of relative frequencies indicative of steering disturbance with respect to the steering speed distribution in the first embodiment of the invention.

FIGS. 1 to 6 show a first embodiment of a visibility adjusting method of a vehicle according to the invention. FIG. 1 is a perspective view of a vehicle as viewed forwardly from inside of the vehicle, FIG. 2 is an explanatory view showing a relation between a parting line and forward visibility as viewed from a driver, FIG. 3 is an explanatory view showing a relation between a line of vision of the driver and the apex of the parting line, FIG. 4 is an explanatory view showing a forward visibility when making a right turn, FIGS. 5A and 5B show a relation between a head angle and a pendulum angle when the vehicle turns, and FIG. 6 is a graph showing a relation of relative frequencies indicative of steering disturbance with respect to the steering speed distribution.

According to the visibility adjusting method of a vehicle in the first embodiment, as shown in FIGS. 1 to 3, a windshield 1 is provided at its lower end with a visibility adjusting section 10 by which a forward visibility of a driver is adjusted.

In the visibility adjusting section 10 of the first embodiment, an apex T is disposed between an opposed position P1 of a driver and a vehicle center position P0 and at a position deviated from the driver by a distance S. Left and right ridgelines Rl and Rr uniformly downwardly incline from the apex T toward opposite sides in the vehicle-width direction. The apex T and the left and right ridgelines Rl and Rr form a parting line 11 which adjusts the lower end visibility of the windshield 1.

In this embodiment, the visibility adjusting section 10 adjusts the lower end visibility of the windshield 1 by shielding a region A lower than the parting line 11.

As shown in FIG. 2, the apex T is located such that a line of vision which connects the apex T and a visual point of a driver M at the time of turning posture is on an outer side of a turning outer side lane Lout when a right-hand vehicle turns to the right (turns to the left if the vehicle is a left-hand vehicle).

As shown in FIG. 3, when a maximum angle of inclination formed between a horizontal line and a ridgeline on the side of the driver, i.e., the right ridgeline Rr in the case of the right-hand vehicle and a left ridgeline Rl in the case of the left-hand vehicle is defined as $\theta 1$ and $\theta 2$, they are set greater than a roll angle $\theta R$ of the vehicle.

In FIG. 1, a reference number 2 represents a steering wheel, a reference number 3 represents a control lever, a reference number 4 represents a right front door, and a reference number 5 represents a left front door.

According to the first embodiment, with the above configuration, the parting line 11 of the visibility adjusting section 10 provided on the lower end of the windshield 1 is uniformly downwardly inclined toward the opposite sides in the vehicle-width direction from the apex T deviated from the driver M. Therefore, as shown in FIG. 4, the inclination of the forward visibility is suppressed by the inclined parting line 11, and the sway of the head inclination angle $\theta H$ (see FIG. 5A) at the time of turning can be suppressed. With this, the driver's posture is stabilized and the steering disturbance can be suppressed.

In order to obtain the effect of the visibility adjusting section 10 in this embodiment in a quantitative manner, as shown in FIG. 5A, the head inclination angle $\theta H$ of the driver M and the angle $\theta G$ shown by a pendulum disposed on a seat back surface so that the vector sum of the acceleration of gravity and the turning lateral acceleration can be checked, are compared with each other. A result thereof is shown in FIG. 5B.

When the driver M positions the head inclination angle $\theta H$ such that the vector sum of the acceleration of gravity and the turning lateral acceleration is directed in the direction near the head vertical axis, $\theta H$ becomes equal to $\theta G$. The turning lateral acceleration generated during normal running is in a range of 0.2 to 0.6 G. If $\theta G$ at that time is obtained, since tan $\theta G$=0.2 to 0.6, $\theta G$ exists in a range of 10 to 30 deg.

As shown in the result of experiment in FIG. 5B, the condition of $\theta G$=10 to 30 deg is substantially satisfied. With this, variation in the head inclination angle $\theta H$ at the time of turning is reduced, the position of the head D is stabilized, and there is a tendency that the head angle $\theta H$ becomes shallower than the pendulum angle $\theta G$ indicative of the turning lateral acceleration, i.e., a neck of the driver M is stabilized.

As shown in FIG. 6, even when the vehicle abruptly turns on an interchange of an expressway, the distribution value (≅disturbance of steering operation) of the steering speed is reduced with excellent repeatability, and it can be understood that the driving load is reduced only by visual effect.

The lateral asymmetry of the visibility of the visibility adjusting section 10 of this embodiment can be corrected by deviating the parting line 11 from the position opposed to the driver M by a distance S, and by disposing the apex T closer to the driver M than the vehicle center position P0 as shown in FIG. 1.

The apex T is set such that when the right-hand vehicle turns to the right (turns to the left if the vehicle is the left-hand vehicle), the line of vision connecting the apex T and the visual point at the time of turning posture is located outer side than the turning outer side lane. Therefore, the above effect can further be enhanced.

The maximum angles θ1 and θ2 formed between the ridgelines Rr and Rl of the driver M side and the horizontal line are greater than the roll angle θR of the vehicle. Thus, the effect can be obtained stably.

Second Embodiment

Figure 7:
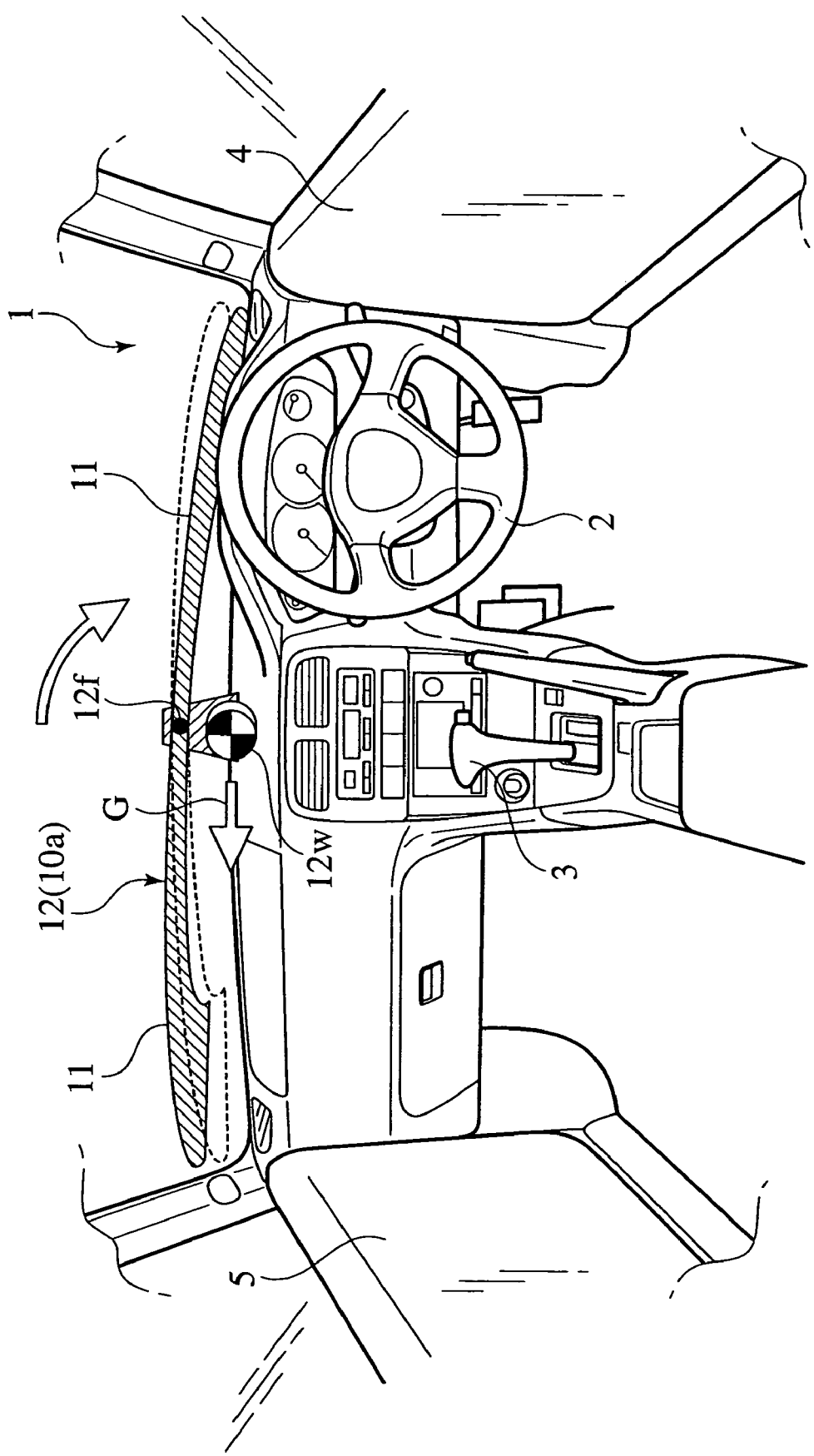
FIG. 7 is a perspective view of a vehicle as viewed forwardly from inside of the vehicle according to a second embodiment of the invention.

FIG. 7 shows a second embodiment. The same constituent portions as those in the first embodiment are designated with the same symbols and redundant explanation will be omitted. FIG. 7 is a perspective view of the vehicle as viewed forwardly from inside of the vehicle.

As shown in FIG. 7, according to the visibility adjusting method of a vehicle of the second embodiment, the parting line 11 of a visibility adjusting section 10a is displaced in accordance with a vehicle orientation and/or a vehicle acceleration.

That is, according to the visibility adjusting section 10a of this embodiment, as shown in FIG. 7, the lower end of the windshield 1 is provided with a movable plate 12 extending in the vehicle-width direction, and the movable plate 12 is mounted on the vehicle body such that the movable plate 12 can swing laterally and an intermediate portion of the movable plate 12 functions as a fulcrum 12f. A mass body 12w which is integral with the movable plate 12 is provided on the fulcrum 12f downward like a pendulum. The inertia force when the vehicle makes a turn, i.e., a vehicle orientation or a vehicle lateral acceleration G is detected by the mass body 12w, and the detected value is transmitted to the movable plate 12.

An upper end edge of the movable plate 12 is the parting line 11.

With the above configuration, according to the visibility adjusting method of the vehicle of the second embodiment, the fulcrum 12f of the movable plate 12 forming the parting line 11 is located higher than the mass body 12w which functions as a barycenter. Thus, when the vehicle makes a right turn for example, the mass body 12w is displaced leftward by the inertia force and with this, a right side of the movable plate 12 inclines downward and the downward inclination angle of the parting line 11 is increased. Thus, the sense of balance of the driver is stabilized and the sway of the head inclination angle can be suppressed.

Therefore, in this embodiment, the parting line 11 can be varied in accordance with the turning condition such as a roll angle of the vehicle body, thus the visibility condition can be optimized in accordance with the turning condition.

In this embodiment, the swinging angle of the mass body 12w need not always be displaced to the direction of the vector sum of the turning lateral acceleration and the acceleration of gravity, and the angle variation may be limited using a stopper (not shown). Alternatively, a speed reducing mechanism (not shown) may be provided on a position of the fulcrum 12f, and the inclination angle of the parting line 11 may be set smaller than that in the direction of the vector sum of the turning lateral acceleration and the acceleration of gravity.

In this embodiment, the parting line 11 of the visibility adjusting section 10a is displaced mechanically using the movable plate 12 and the mass body 12w. However, the invention is not limited to this, the visibility adjusting section may be a liquid crystal panel, and the shielding shape by the liquid crystal panel may be changed in accordance with a signal output from a unit which detects the turning acceleration.

Third Embodiment

Figure 8:
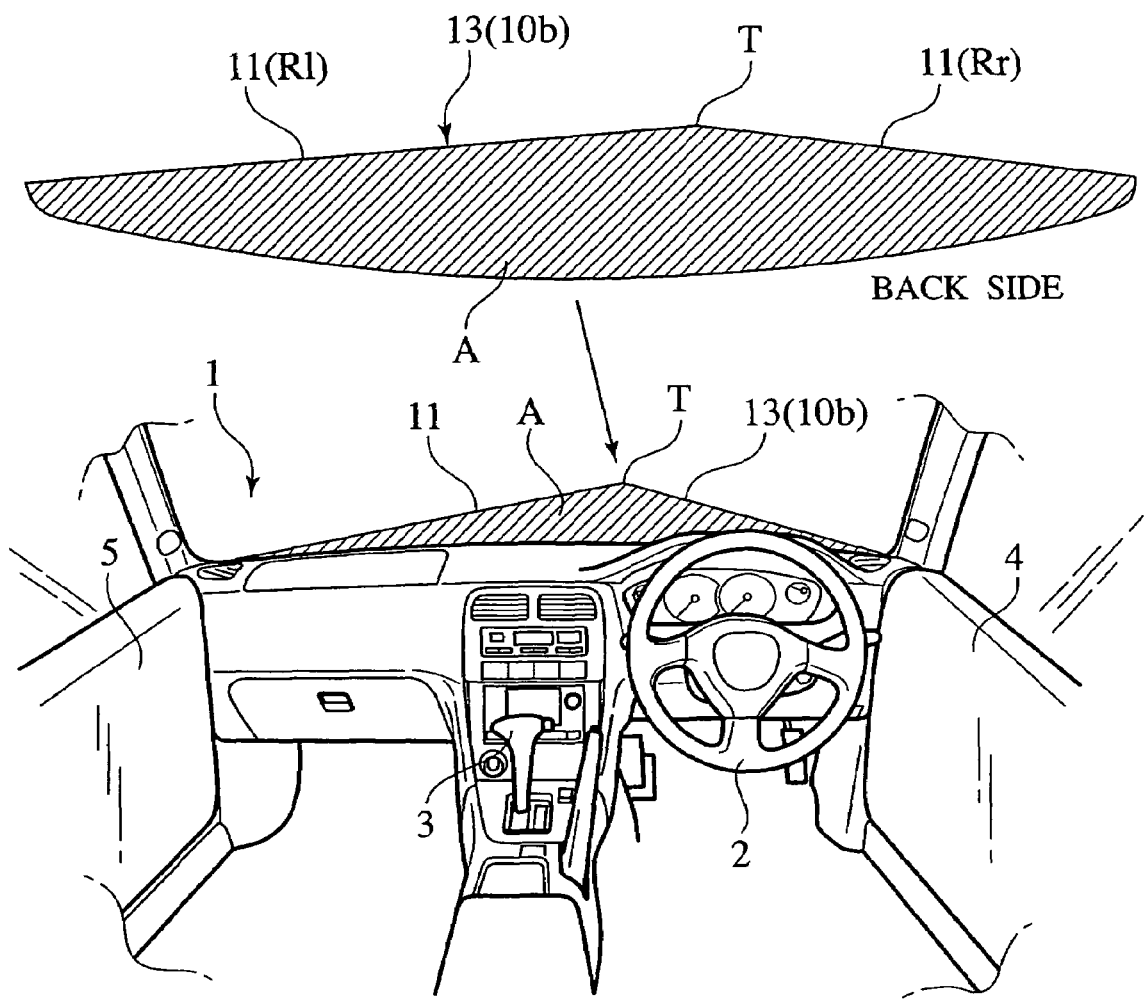
FIG. 8 is a perspective view of a vehicle as viewed forwardly from inside of the vehicle according to a third embodiment of the invention.
Figure 9:
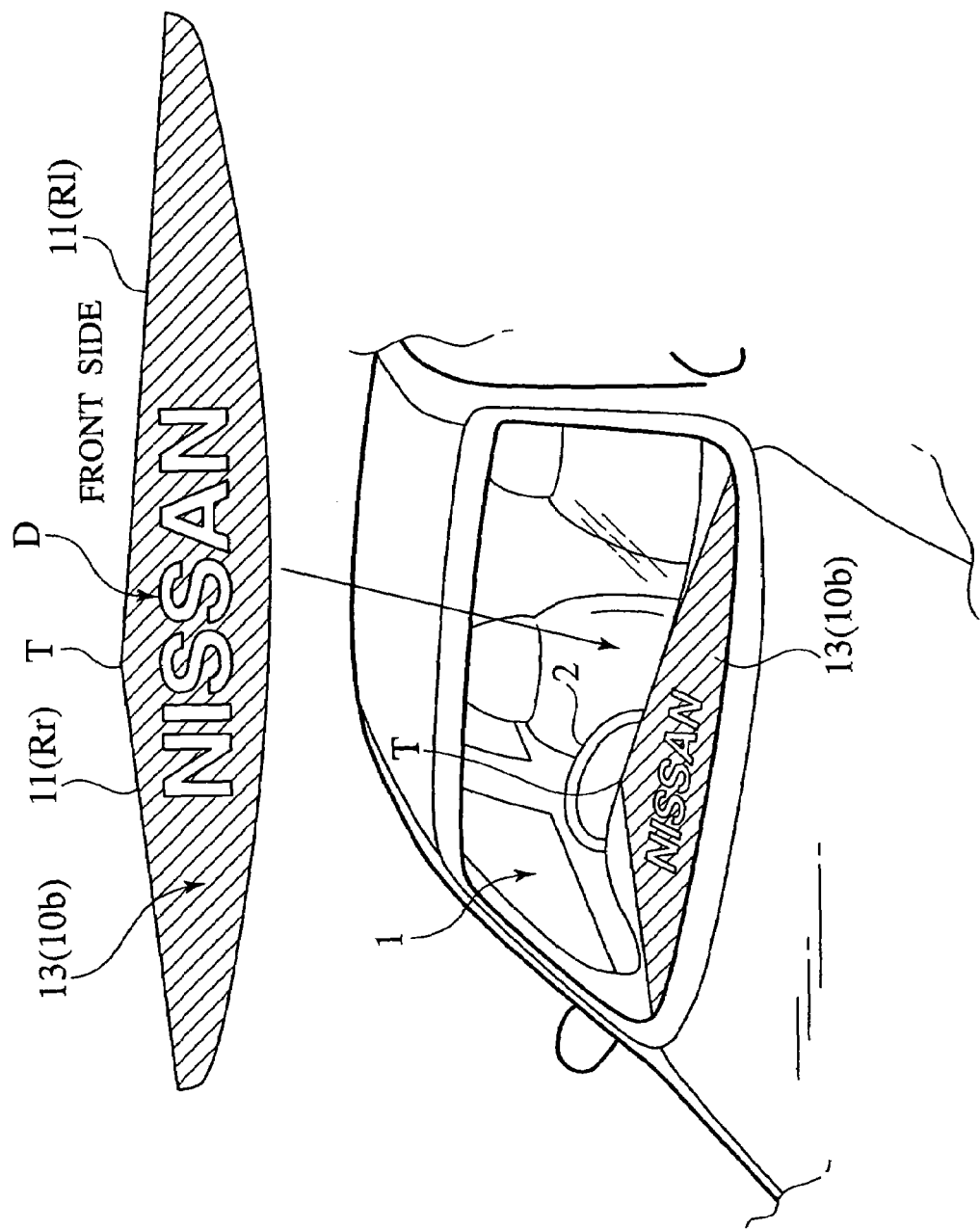
FIG. 9 is a perspective view of a windshield portion as viewed from front of the vehicle in the third embodiment of the invention.

FIGS. 8 and 9 show a third embodiment of the invention. The same constituent portions as those in the first embodiment are designated with the same symbols and redundant explanation will be omitted. FIG. 8 is a perspective view of the vehicle as viewed forwardly from inside of the vehicle, and FIG. 9 is a perspective view of the windshield portion as viewed from front of the vehicle.

According to the visibility adjusting method of the vehicle of the third embodiment, as shown in FIG. 8, a visibility adjusting section 10b is a shielding plate 13 formed along a shape of a region A lower than the parting line 11.

At that time, the shielding plate 13 is made of flexible plate material so that the shielding plate 13 can be impregnated along the curve shape of the windshield 1. For example, a black film sheet can be used.

In this embodiment, as shown in FIG. 9, an adornment D is added on one surface (outer surface) of the shielding plate 13.

With this configuration, according to the visibility adjusting method of the vehicle of the third embodiment, the visibility adjusting section 10b is the shielding plate 13 formed along the shape of the region A located lower than the parting line 11. Thus, the visibility adjusting section 10b can be provided as a separate part and it is possible to achieve the object without subjecting the windshield 1 to a special working such as black printing on the window frame.

The shielding plate 13 can be added at a later stage as an optionally available part, and the visibility adjusting method of the present invention can easily be achieved.

Since the shielding plate 13 is provided with the adornment D, the commercial value can be enhanced by the effect of the adornment. At that time, the position of the adornment D is not limited to the outer side surface of the shielding plate 13, and the adornment D may be provided on an inner side surface.

Fourth Embodiment

Figure 10:
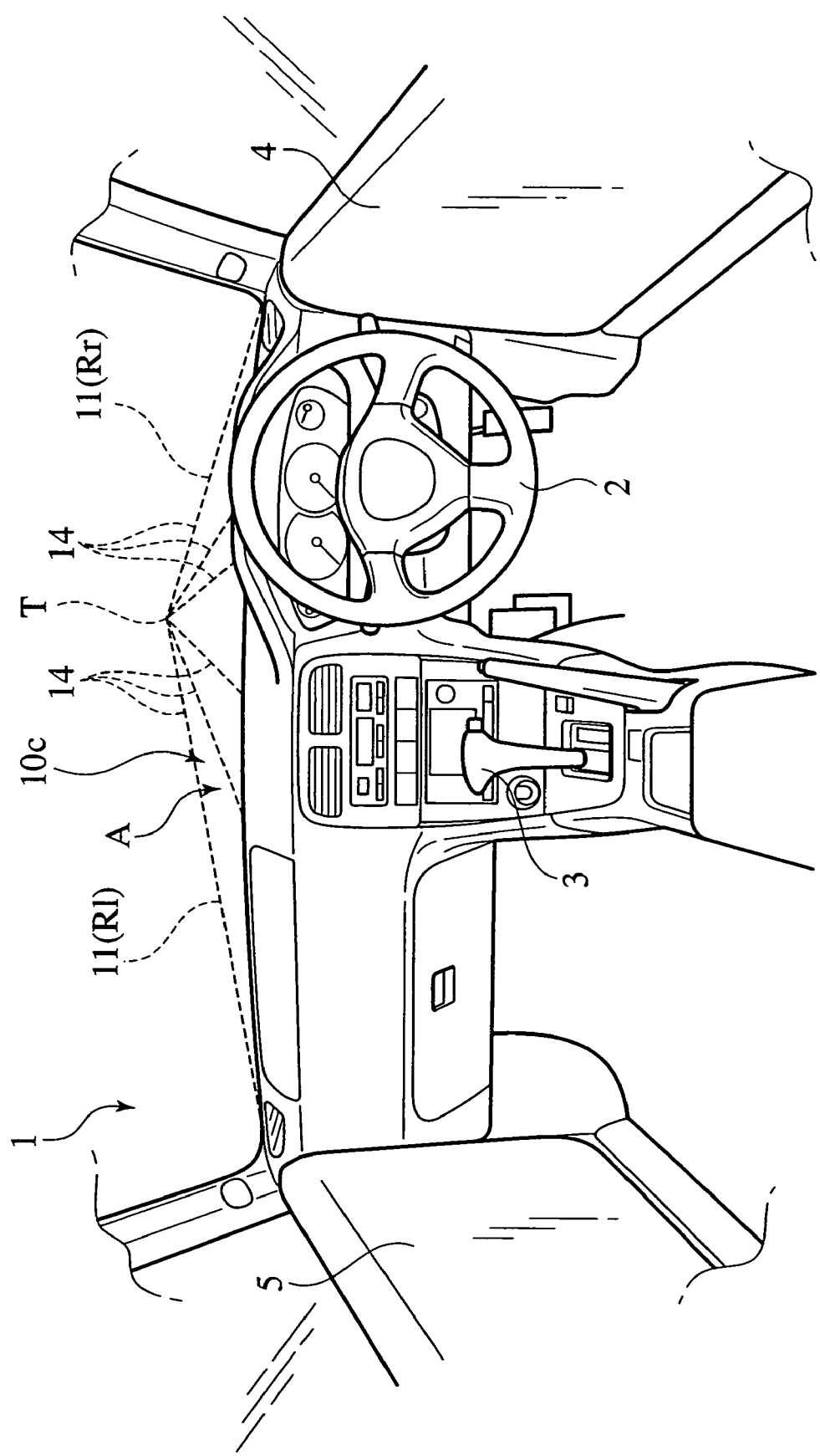
FIG. 10 is a perspective view of a vehicle as viewed forwardly from inside of the vehicle according to a fourth embodiment of the invention.

FIG. 10 shows a fourth embodiment of the invention. The same constituent portions as those in the first embodiment are designated with the same symbols and redundant explanation will be omitted. FIG. 10 is a perspective view of a vehicle as viewed forwardly from inside of the vehicle.

According to the visibility adjusting method of the vehicle of the fourth embodiment, a visibility adjusting section 10c is displayed such that a plurality of plotting straight lines (or plotting curves) 14 each having appropriate line width including the parting line 11 in the windshield 1 gather at the apex T.

With this configuration, according to the visibility adjusting method of the vehicle of the fourth embodiment, since a large gap is formed between the plotting straight lines 14, the shielding portion in the region A located lower than the parting line 11 can largely be reduced and the degree of freedom for securing the visibility can be enhanced.

Fifth Embodiment

Figure 11:
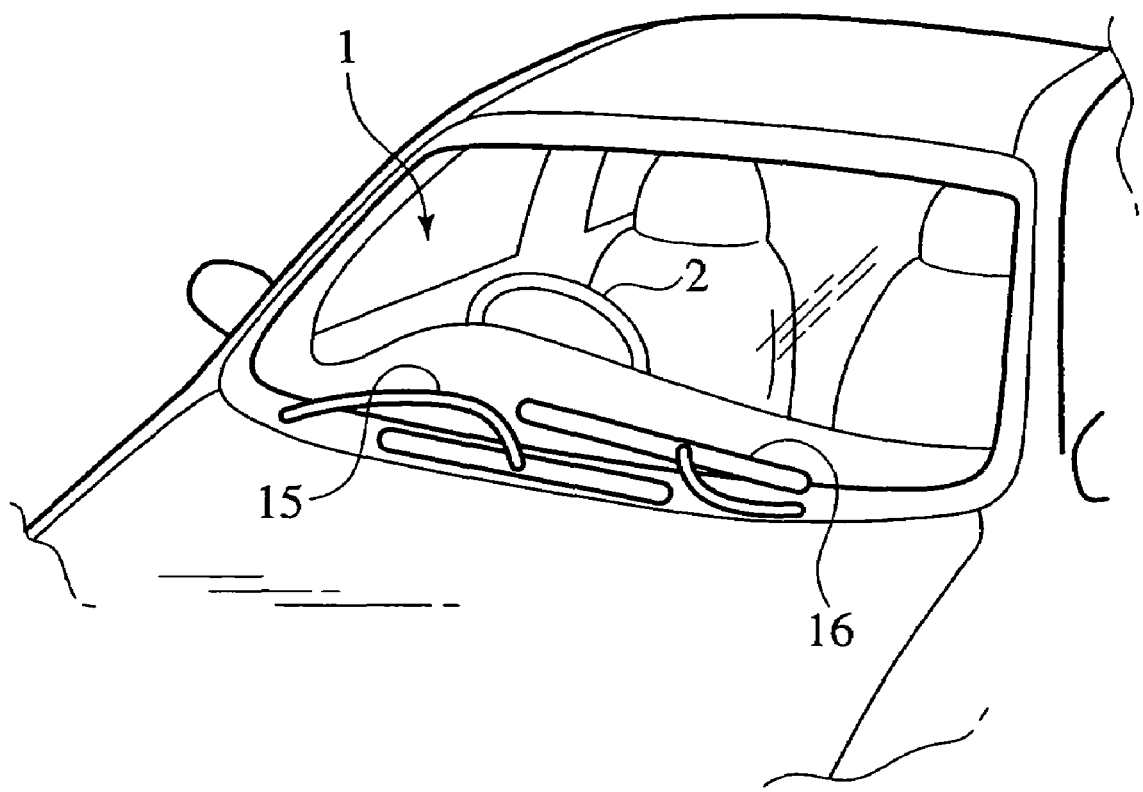
FIG. 11 is a perspective view of a windshield portion as viewed from front of the vehicle in a fifth embodiment of the invention.

FIG. 11 shows a fifth embodiment of the invention. The same constituent portions as those in the first embodiment are designated with the same symbols and redundant explanation will be omitted. FIG. 11 is a perspective view of a windshield portion as viewed from front of the vehicle.

According to the visibility adjusting method of the vehicle of the fifth embodiment, the plotting straight line (or plotting curve) 14 for displaying the visibility adjusting section 10c shown in FIG. 10 in the fourth embodiment is replaced by wiper arms 15 and wiper blades 16 as shown in FIG. 11.

That is, each of the wiper arms 15 and the wiper blades 16 is a rod body having a predetermined width. The right wiper arm 15 is bent at a predetermined angle such as to form a right ridgeline Rr, a right end of the left wiper blade 16 is set close to the wiper arm 15 and is inclined at a predetermined angle such that the wiper blade 16 forms a left ridgeline Rl, and the apex T is formed at the adjacent portion between the wiper arm 15 and the wiper blade 16.

With this configuration, according to the visibility adjusting method of the vehicle of the fifth embodiment, since the existing wiper arms 15 and wiper blades 16 are used, the visibility adjusting section 10c can be formed without subjecting the window area to a special working.

When it is desired to displace the parting line 11 in accordance with the vehicle orientation and/or the vehicle acceleration as in the second embodiment, a step motor can be used for the wiper.

In the visibility adjusting sections 10, and 10a to 10c of the first to fifth embodiments, the lower end of the windshield 1 is shielded, and the movable plate 12, the shielding plate 13, the plotting straight line (curve) 14, the wiper arm 15 and the wiper blade 16 are used. However, the present invention is not limited to this, and the visibility adjusting section may be formed by a shape of an upper surface of an instrument panel or by a shape of the vehicle body.

Sixth Embodiment

Figure 12:
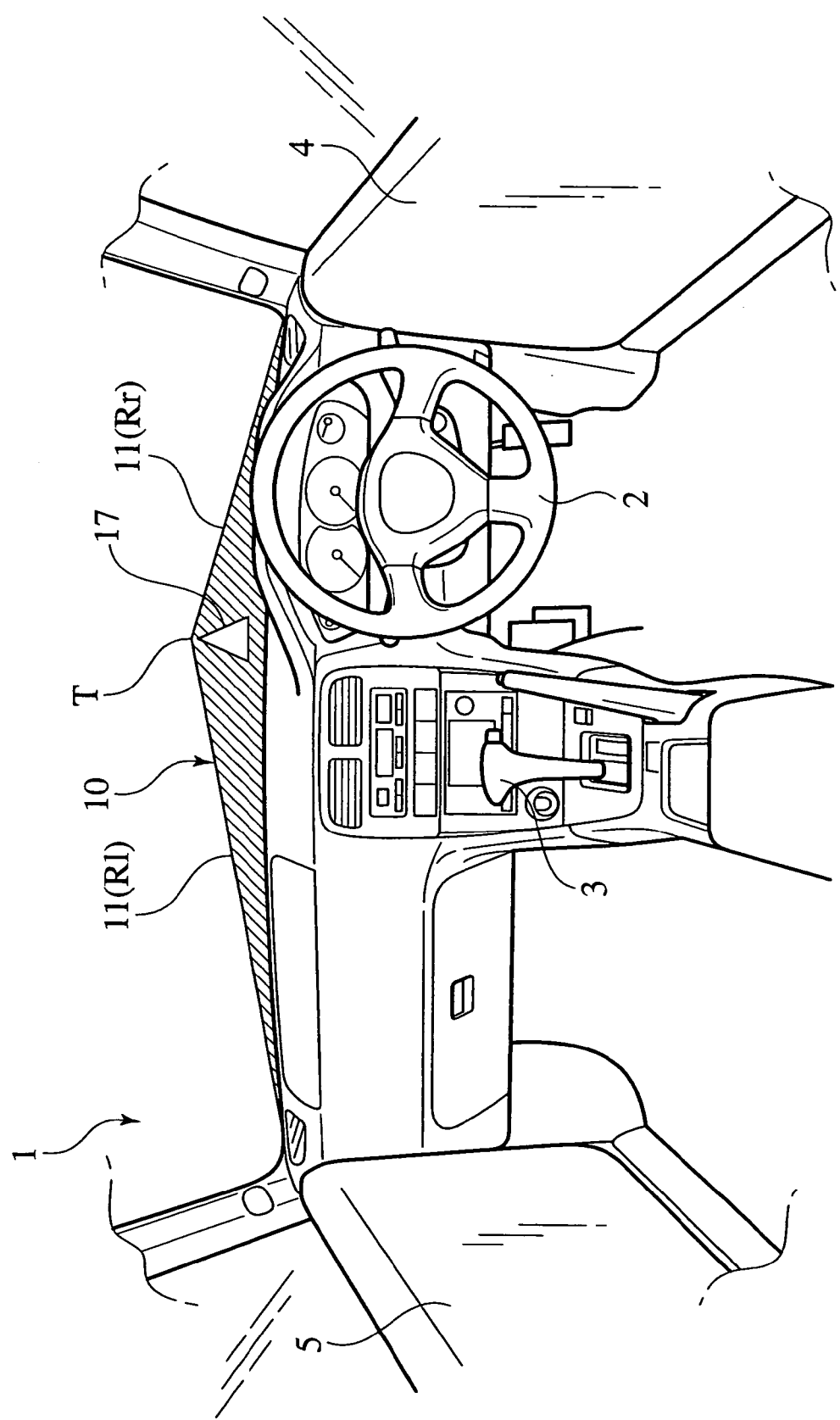
FIG. 12 is a perspective view of a vehicle as viewed forwardly from inside of the vehicle according to a sixth embodiment of the invention.

FIG. 12 shows a sixth embodiment of the invention. The same constituent portions as those in the first embodiment are designated with the same symbols and redundant explanation will be omitted. FIG. 12 is a perspective view of a vehicle as viewed forwardly from inside of the vehicle.

The visibility adjusting method of the vehicle of the sixth embodiment can be applied to any of the first to fifth embodiments. As shown in FIG. 12, a triangular mark 17 is added for clearly showing a position of the apex T of the visibility adjusting section 10.

With this configuration, according to the visibility adjusting method of the sixth embodiment, a point where the inclination of the ridgelines Rl and Rr is switched can clearly be shown. When the line of vision of the driver is located near the apex T, sway of slight or fine line of vision is suppressed and the sense of balance of the driver can be stabilized.

The means for clearly showing the apex T of the present embodiment is not limited to the triangular mark 17 only if the driver can easily recognize the apex T.

Seventh Embodiment

Figure 13:
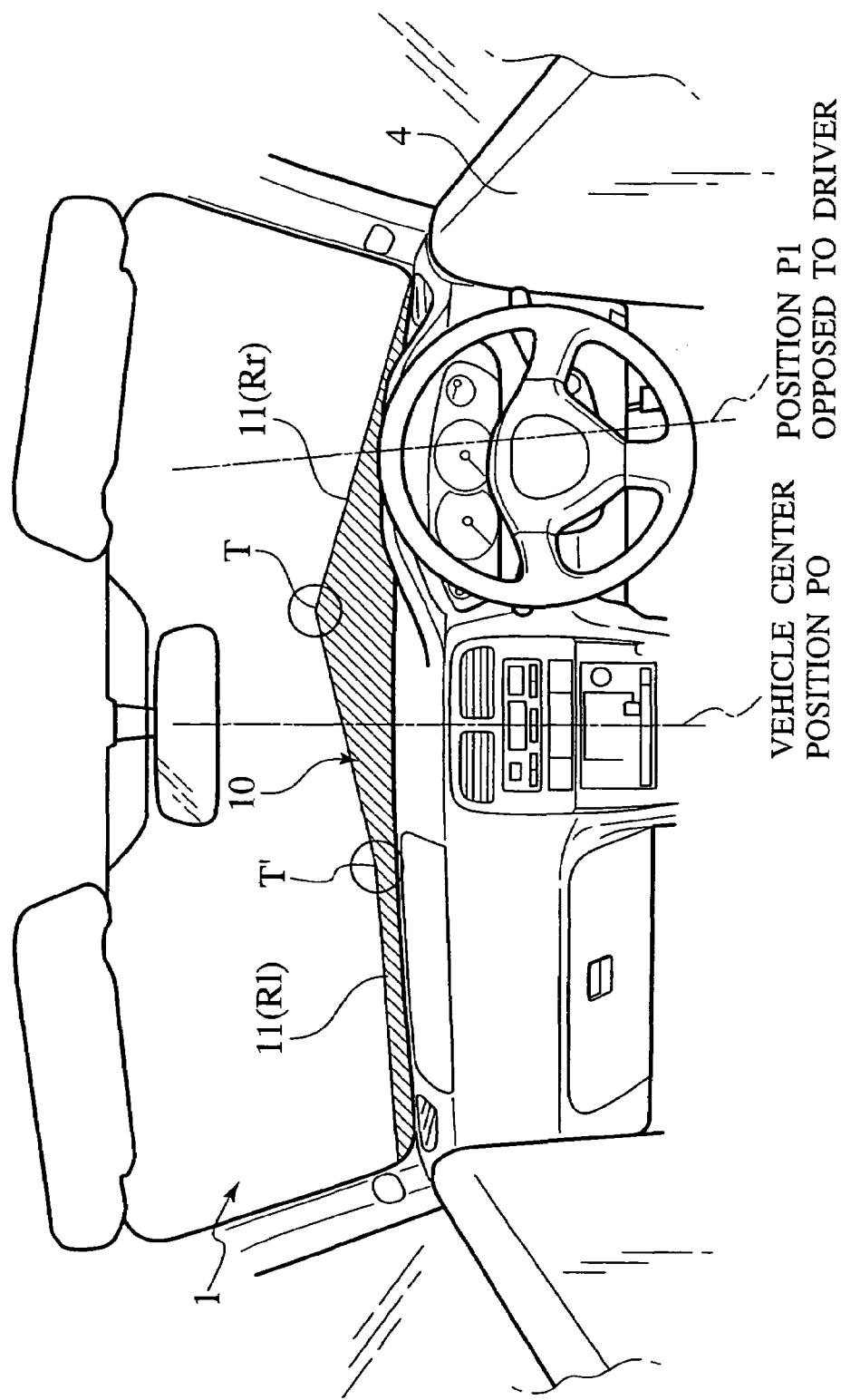
FIG. 13 is a perspective view of a vehicle as viewed forwardly from inside of the vehicle according to a seventh embodiment of the invention.

A seventh embodiment of the invention will be explained next. FIG. 13 is an explanatory view showing a configuration around the windshield of the vehicle to which the visibility adjusting method of the seventh embodiment is applied. As shown in FIG. 13, in the seventh embodiment, like the first embodiment, the lower end of the windshield 1 is provided with the visibility adjusting section 10 by which forward visibility of the driver is adjusted.

According to the visibility adjusting section 10 of this embodiment, the apex T is disposed between the opposed position P1 of the driver and the vehicle center position P0 and at a position deviated from the driver, and a right ridgeline 11 (Rr) which uniformly downwardly inclines from the apex T toward a driver's seat in the vehicle-width direction is set.

On the other hand, a left ridgeline 11 (Rl) having a flexion T' from the apex T toward a passenger seat in the vehicle-width direction and downwardly inclining is set. These apex and the ridgelines form the parting line 11 which adjusts the lower end visibility of the windshield 1.

Figure 14A:
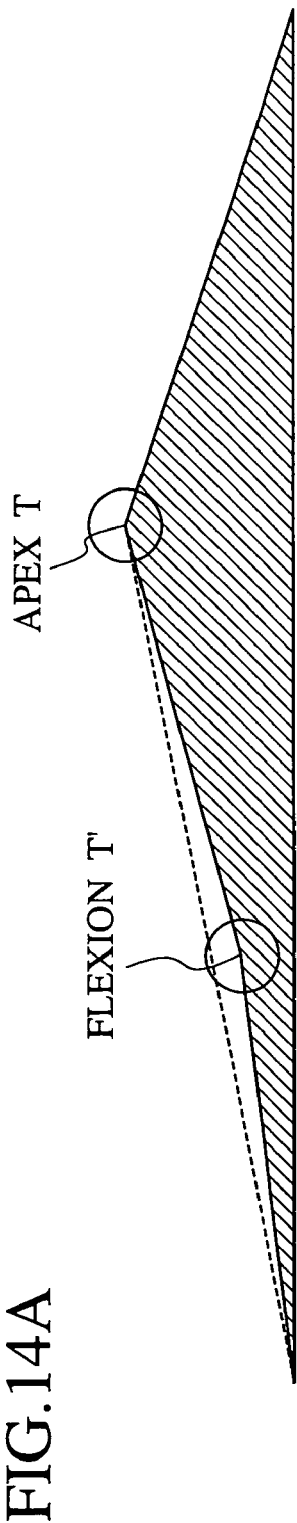
Figure 14B:
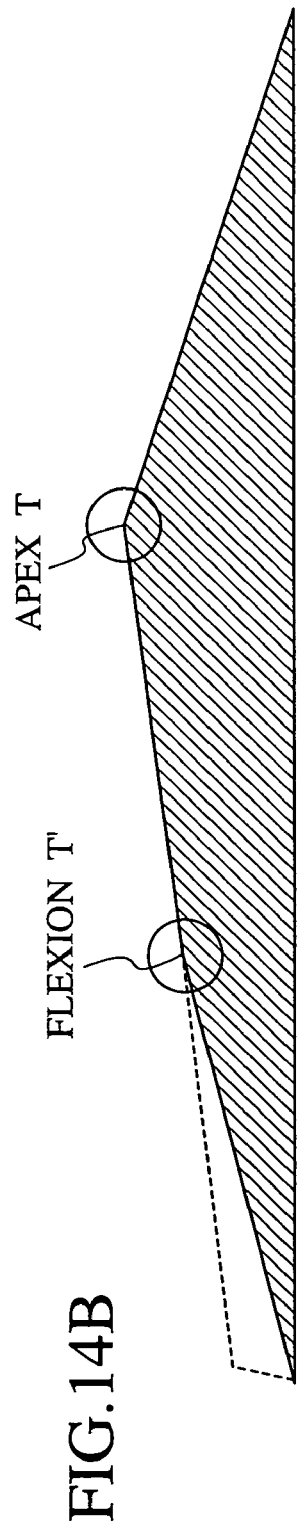
Figure 14C:
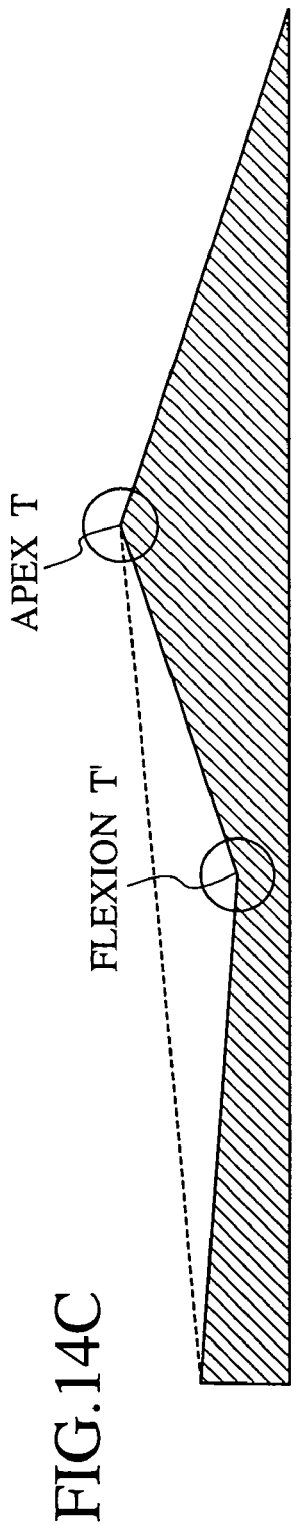

A shape including the flexion T' as shown in FIGS. 14A to 14C can be used for the right ridgeline 11 (Rl).

An angle of a first ridgeline (ridgeline from the apex T to the flexion T') extending from the apex T to the left side (passenger seat side) can be increased. It is preferable that a ridgeline which is convex downward as shown in FIG. 14A or 14C is used as a shape that is most effective when the vehicle makes a turn from the straightly running state. In order to reduce the area of the visibility control section, it is preferable that the ridgeline on the left side of the flexion T' is also inclined downward as shown in FIG. 14A.

As shown in FIG. 14B, even in a shape of the ridgeline which is convex upward, since the angle of the ridgeline is increased in a region from the flexion T' to the end of the visibility control section, a shape shown in FIG. 14B can also be used in accordance with requirement of design of the vehicle.

Figure 15:
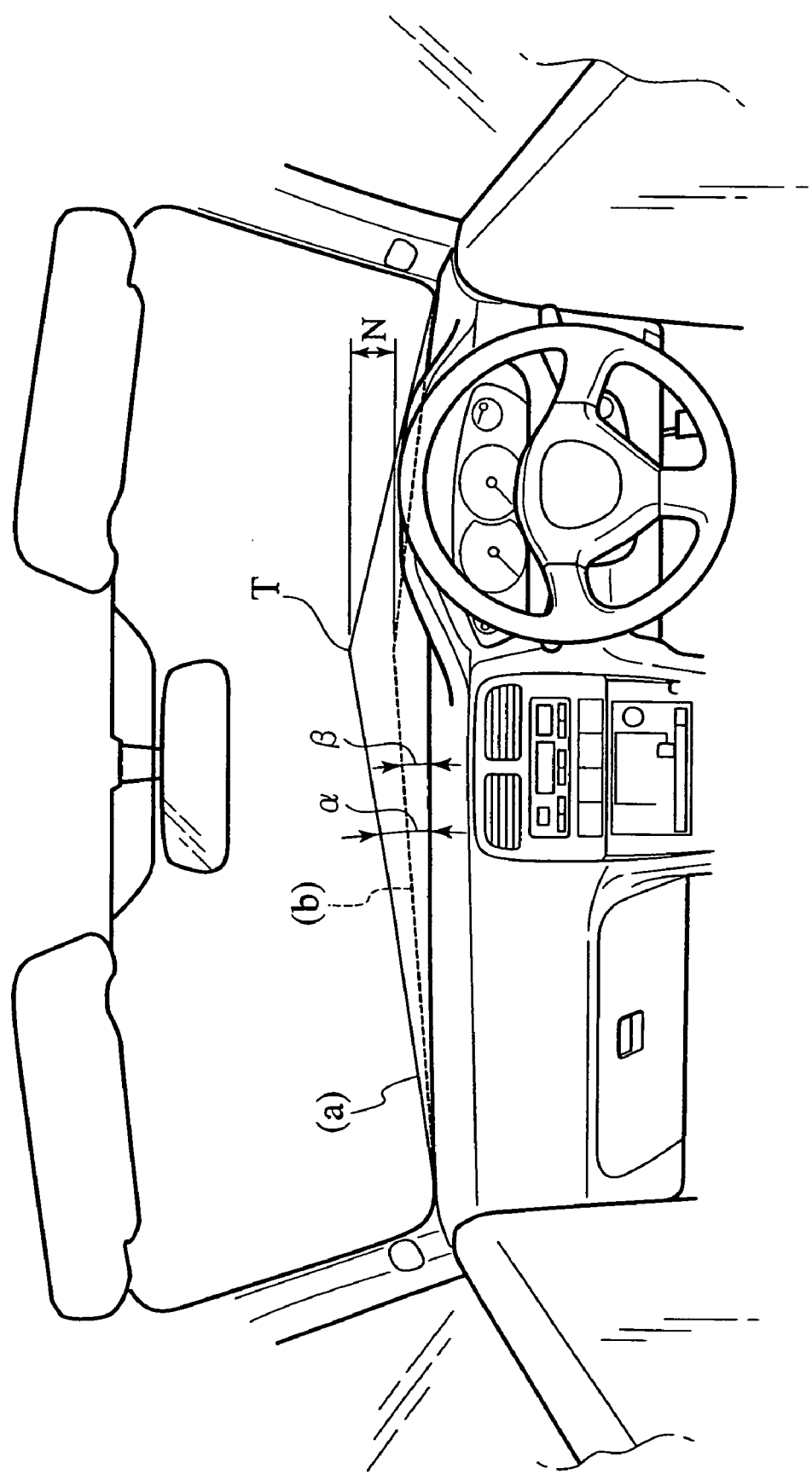
FIG. 15 is an explanatory view showing a shape of the visibility adjusting section when the present invention is not used.

When the flexion T' is not provided, if the angle formed between the ridgeline and the horizontal surface is set great like the angle α shown in FIG. 15 to further stabilize the posture of the driver at the time of turning of the vehicle, a lower portion of the straight line shown with a symbol (a) adversely becomes the visibility adjusting section and thus, the area of the visibility adjusting section is adversely increased.

On the other hand, if a ridgeline shown with a symbol (b) in FIG. 15 is set to reduce the area of the visibility adjusting section, the position of the apex T is lowered by a distance N, the angle β of the ridgeline is reduced, and the posture at the time of turning of the vehicle can not be stabilized.

In the seventh embodiment, by providing the passenger seat side ridgeline with the flexion T', the area of the visibility adjusting section can be reduced while stabilizing the posture at the time of turning of the vehicle, and it is possible to both stabilize the posture at the time of turning of the vehicle and secure the wide forward visibility at the time of low speed running of the vehicle.

That is, in the visibility adjusting method and the visibility adjusting apparatus of a vehicle which provides the forward visibility with the parting line by forming the visibility adjusting section at the lower end of the windshield to shield the forward visibility, the parting line is deviated from the position opposed to the driver, the apex is formed at a location closer to the driver than the vehicle center, and the ridgelines are downwardly inclined to the left and right from the apex in the vehicle-width direction. With this configuration, the lower end of the windshield can be provided with the parting line which shields the forward visibility and inclines to the left and right. Therefore, it is possible to stabilize the sense of balance of the driver, to suppress the sway of the head inclination angle, to stabilize the driver's posture, and to suppress the steering disturbance.

Even when the height of the apex is reduced by providing the straight line extending from the apex toward the passenger seat with the flexion, since it is possible to increase the angle between the horizontal direction and the ridgeline which is a parting line which can reduce the head inclination angle, the head inclination angle can be reduced while reducing the shielding area.

Eighth Embodiment

Figure 16:
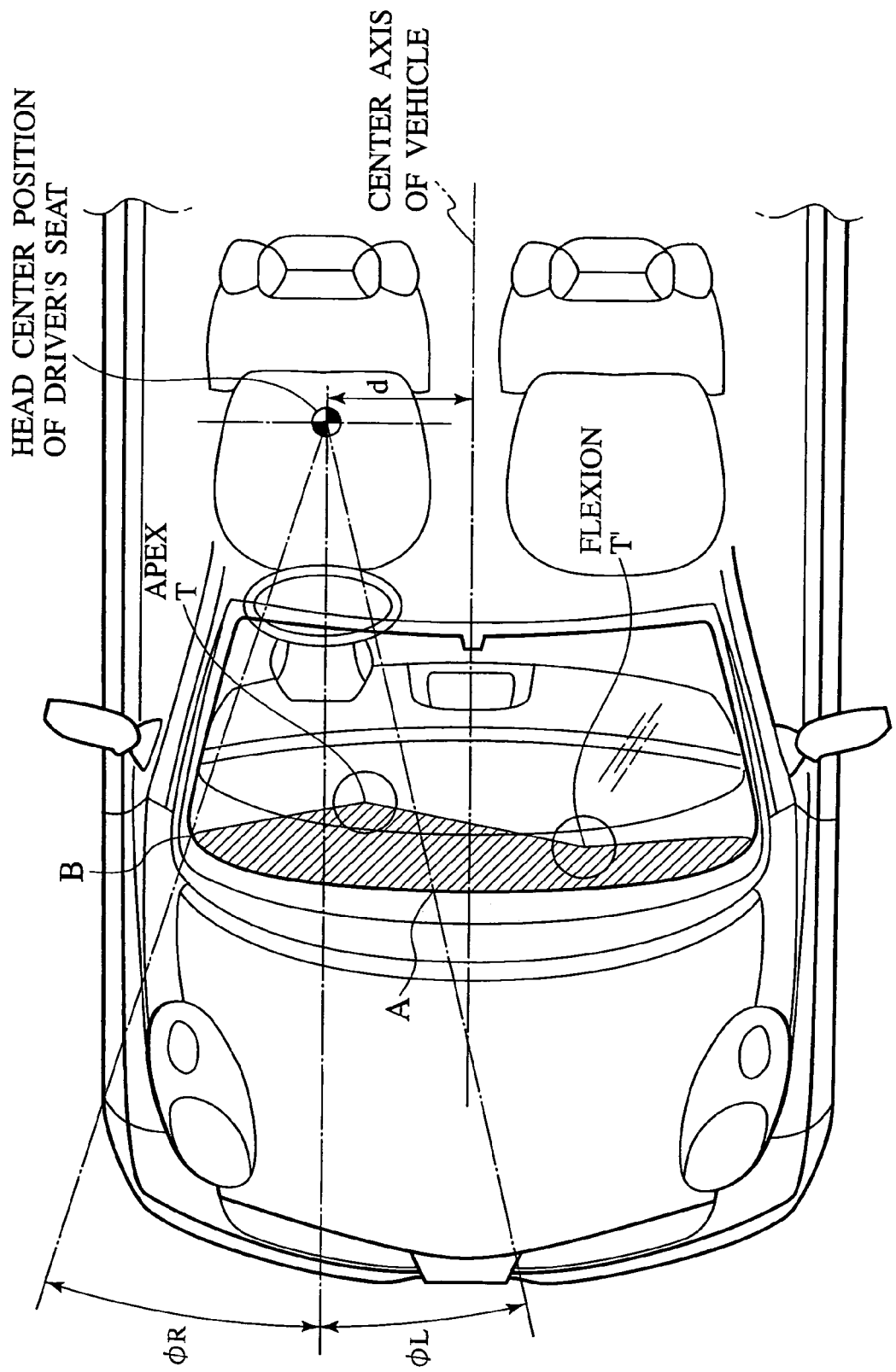
FIG. 16 is an explanatory view showing the vehicle as viewed from above according to an eighth embodiment of the invention.
Figure 17:
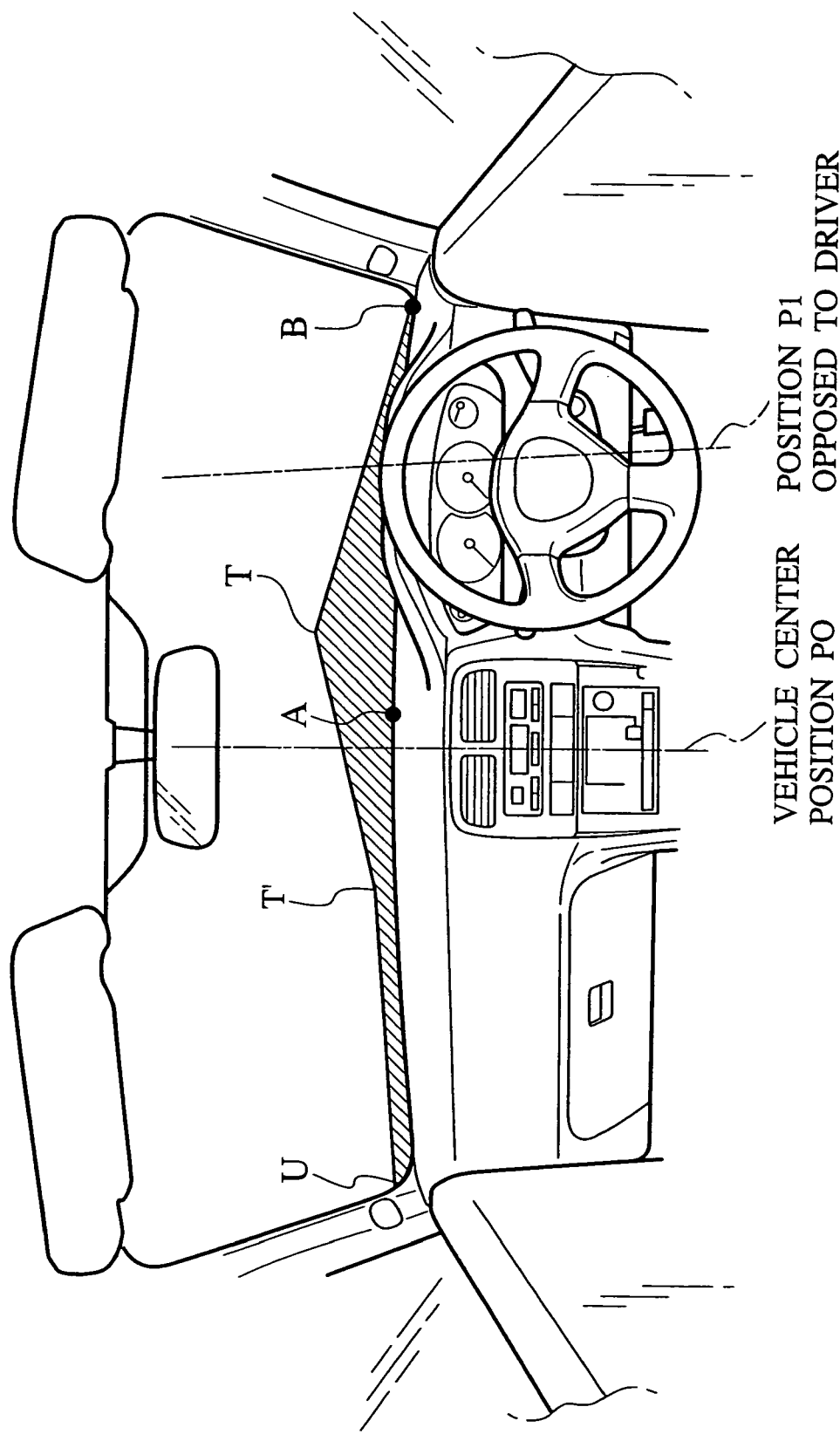
FIG. 17 is a perspective view of a vehicle as viewed forwardly from inside of the vehicle according to the eighth embodiment of the invention.

Next, an eighth embodiment of the invention will be explained. FIGS. 16 and 17 are explanatory views showing a configuration of a vehicle to which the visibility adjusting method of the eighth embodiment is applied. As shown in FIG. 16, the head center position of the driver's seat and a center axis of the vehicle are deviated from each other by a distance d. An angle between the longitudinal direction of the vehicle and a straight line connecting the head center position of the driver's seat and a right lower end B of the window frame is defined as φR. A function shown in the following equation (1) is obtained by a width W of a road ahead of the vehicle, the deviation d and the angle φR:

$$f(\varphi_R, W, d) = \cos^{-1}\left\{\frac{1}{R_{min}+d}\left(R_{min}-\frac{W}{2}\right)\right\} \quad (1)$$

wherein Rmin=(W−2d cosφR)/2 (1−cos φR)

In the above equation (1), an angle φL equal to or greater than f (φR, W, d) is determined, and a point A where a lower end of the window frame intersects with a straight line forming an angle φR between the head center position of the driver's seat and the longitudinal direction of the vehicle is determined.

As shown in FIG. 17, the flexion T' is disposed at a location closer to the outer end than the point A in the direction of the passenger seat, and a length of a ridgeline T'-T connecting the apex T and the flexion T' is set longer than a ridgeline T'-U connecting the flexion T' and an end point U of the visibility adjusting section. A reason for determining the position of the flexion will be explained below.

Figure 18:
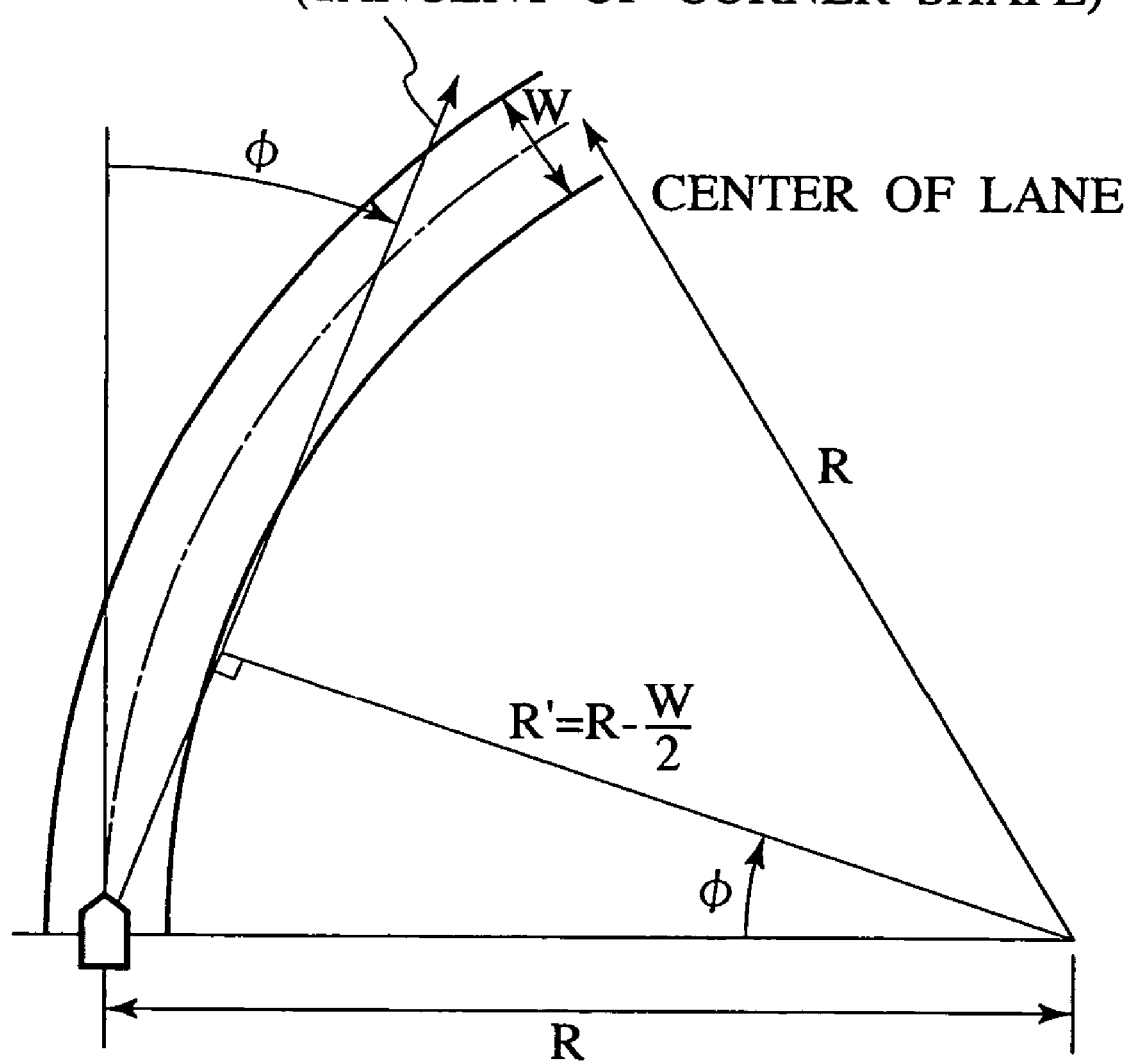
FIG. 18 is an explanatory view geometrically showing a corner and a line of vision of the driver when making a turn.

In a state where the vehicle makes a turn to the left or right, the position of the line of vision of the driver is considered. When the vehicle runs on a center of a road and the driver is also located at a center in the vehicle, if the driver makes the best possible use of the visible range, the line of vision becomes a curved tangent. FIG. 18 is an explanatory view showing the geometrical relation at that time the angle φ formed between the line of vision and the longitudinal direction of the vehicle is obtained by the following equation (2) using a lane width W and a turning radius R:

$$\cos \phi = R'/R = 1 - W/2R \quad (2)$$

Figure 19:
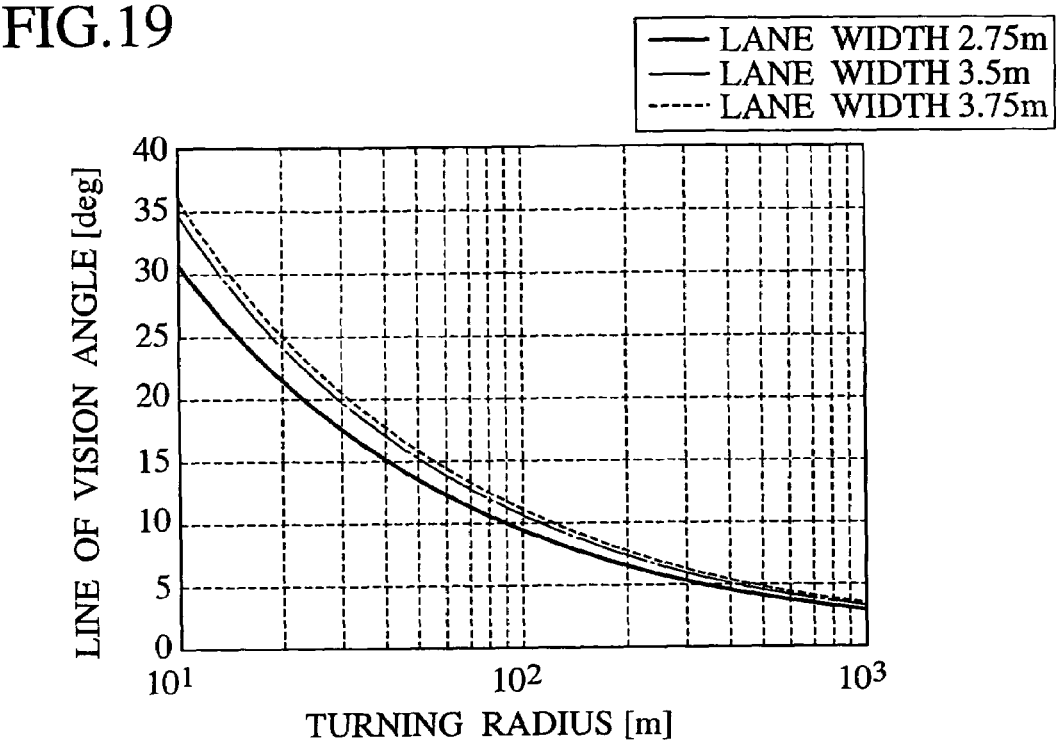
FIG. 19 shows characteristics when the driver is located at a center in the vehicle, and is a graph obtained by plotting an angle between the line of vision and a longitudinal direction of the vehicle with respect to a turning radius.

FIG. 19 shows characteristics when the lane width is varied and this relation is plotted.

In an actual vehicle, a driver's seat is usually deviated from a center of the vehicle. At that time, a lateral difference is generated in the line of vision angle. Provided that the vehicle runs on the center of the road, if the deviation from the center of the driver's seat is defined as "offset" in the case of the right-hand vehicle, the line of vision angle is obtained by the following equation (3) when making a right turn and by the following equation (4) when making a left turn:

$$\cos \phi = \{1/(R-\text{offset})\}*(R-W/2) \quad (3)$$

$$\cos \phi = \{1/(R+\text{offset})\}*(R-W/2) \quad (4)$$

Figure 20:
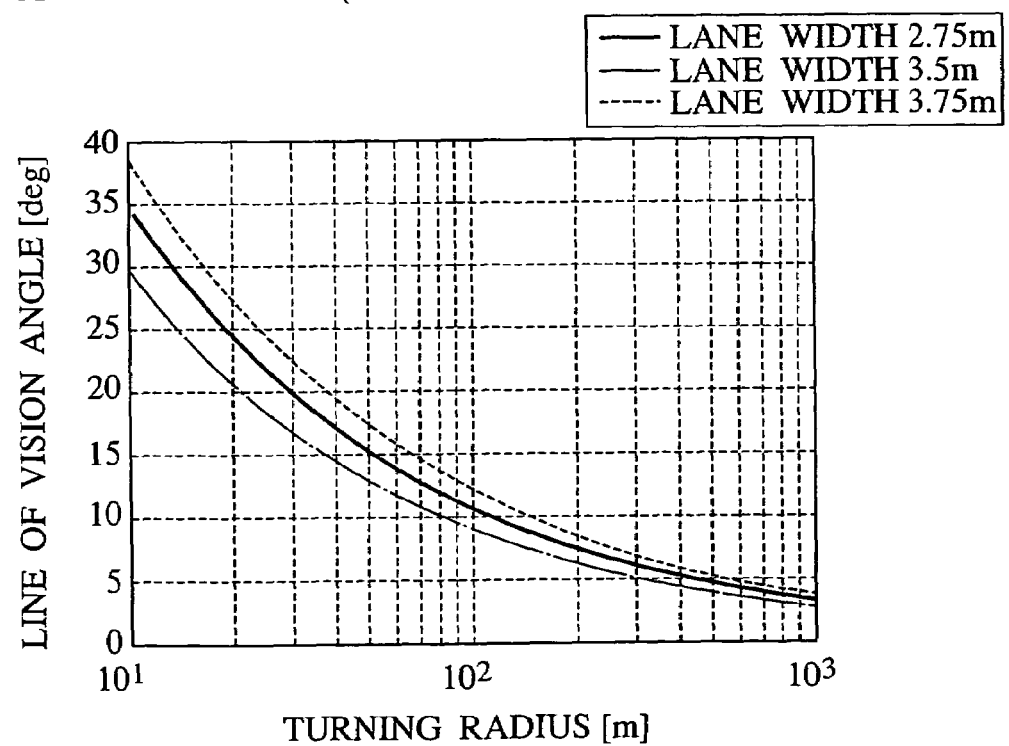
FIG. 20 shows characteristics when the driver is located on the right side in the vehicle, and is a graph obtained by plotting an angle between the line of vision and a longitudinal direction of the vehicle with respect to the turning radius.

A result of calculation is shown in FIG. 20. The calculation here is made based on the offset of 0.5 m and the lane width of 3.5 m. As can be understood from this result, in the case of the right-hand vehicle, even when making a turn having the same radius, the line of vision angle becomes smaller when making the right turn.

Generally, in the case of the right-hand vehicle, a right pillar is closer to the driver's seat than a left pillar. Therefore, a minimum turning radius for obtaining the posture stabilizing effect of this embodiment is uniquely determined as a value which is inherent in each vehicle from a positional relation between the head center position of the driver and a right lower end of the window frame. When an angle formed between a head center position of the driver and a right lower end of the window frame, i.e., between the longitudinal direction of the vehicle and a straight line connecting a lower end of a pillar closer to the driver's seat is defined as φR, the following equation (5) is established. Thus, this minimum turning radius Rmin can be obtained from the following equation (6):

$$\cos \phi R = \{1/(R-d)\}*(R-W/2) \quad (5)$$

$$R_{min} = \frac{W - 2d\cos\varphi_R}{2(1-\cos\varphi_R)} \quad (6)$$

In the minimum turning radius Rmin, a line of vision angle when making a left turn can be obtained from the following equation (7):

$$\varphi_L = \cos^{-1}\left\{\frac{1}{R_{min}+d}\left(R_{min}-\frac{W}{2}\right)\right\} \quad (7)$$

In order to stabilize the posture equally when making a left turn and a right turn, it is necessary that the position of the flexion satisfies the following equation (8) when an angle formed between the longitudinal direction of the vehicle and a straight line connecting the position of the flexion and the head center position of the driver is defined as φk:

$$\varphi_k \geq \varphi_L = \cos^{-1}\left\{\frac{1}{R_{min}+d}\left(R_{min}-\frac{W}{2}\right)\right\} \quad (8)$$

Therefore, if the flexion is formed at a position where the angle φL becomes equal to or greater than f (φR, W, d), the flexion does not enter the vision of the driver in a region within a critical turning radius which is determined by the position of the right pillar and which can benefit the effect of the present invention, and effective effect can be obtained when making a left turn.

The above calculation is made using a lane width of 3.5 m determined by the road structure law as a standard lane width of an expressway, but on an actual road, since a road shoulder is also regarded as the lane, it is preferable to set the lane width while taking the actual running condition into consideration when determining the actual position.

In this embodiment, the length of the ridgeline T'-T connecting the apex T and the flexion T' to each other is set longer than the length of the ridgeline T'-U connecting the flexion T' and the end point U of the visibility adjusting section to each other. With this configuration, the driver is dominantly informed of the first ridgeline extending from the apex T toward the passenger seat. With this, the posture at the time of turning of the vehicle can more effectively be stabilized.

That is, in the eighth embodiment, the flexion is disposed at an outer position than the line of vision moving range toward the passenger seat of the driver when the vehicle turns toward the passenger seat side. Therefore, even if the flexion exists, attention of the driver is not paid to the flexion, and the driving posture of the driver can further be stabilized.

The driver is more dominantly informed of the ridgeline extending from the apex to the flexion than other ridgelines, therefore, the driver's posture can be stabilized without allowing the driver to be aware of the presence of the flexion.

Ninth Embodiment

Figure 21:
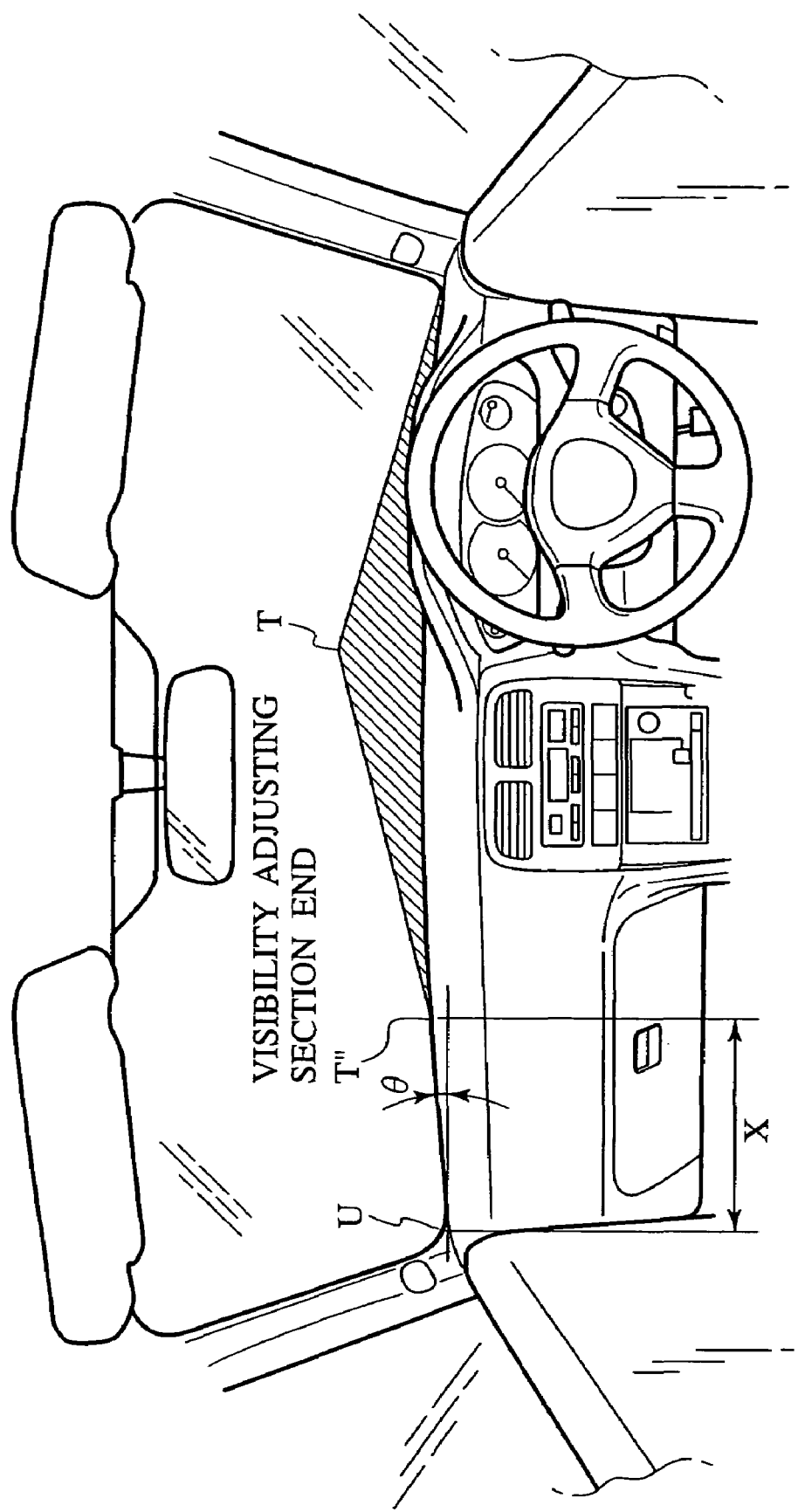
FIG. 21 is a perspective view of a vehicle as viewed forwardly from inside of the vehicle according to a ninth embodiment of the invention.
Figure 22:
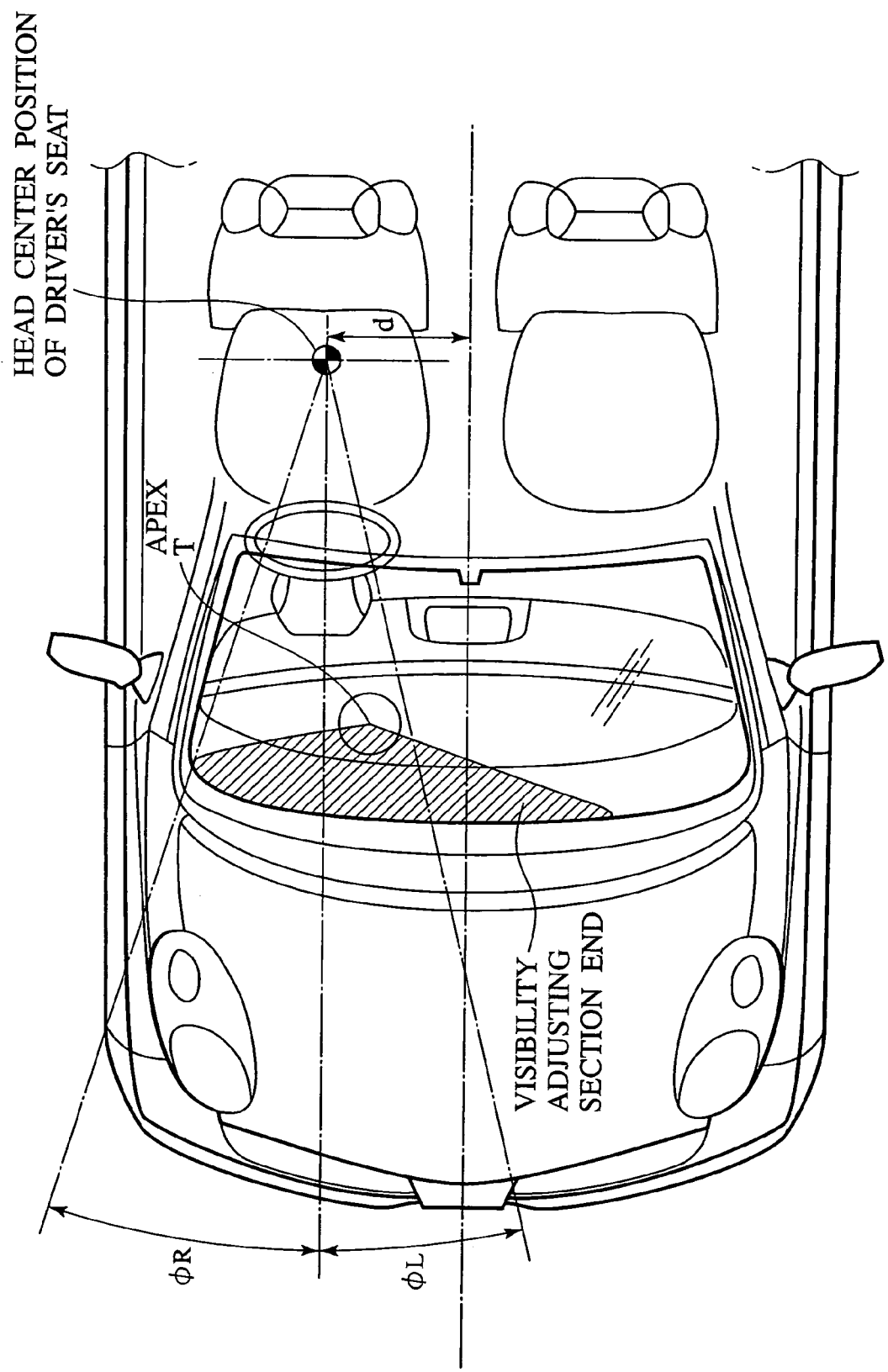
FIG. 22 is an explanatory view of the vehicle as viewed from above according to the ninth embodiment of the invention.
Figure 23A:
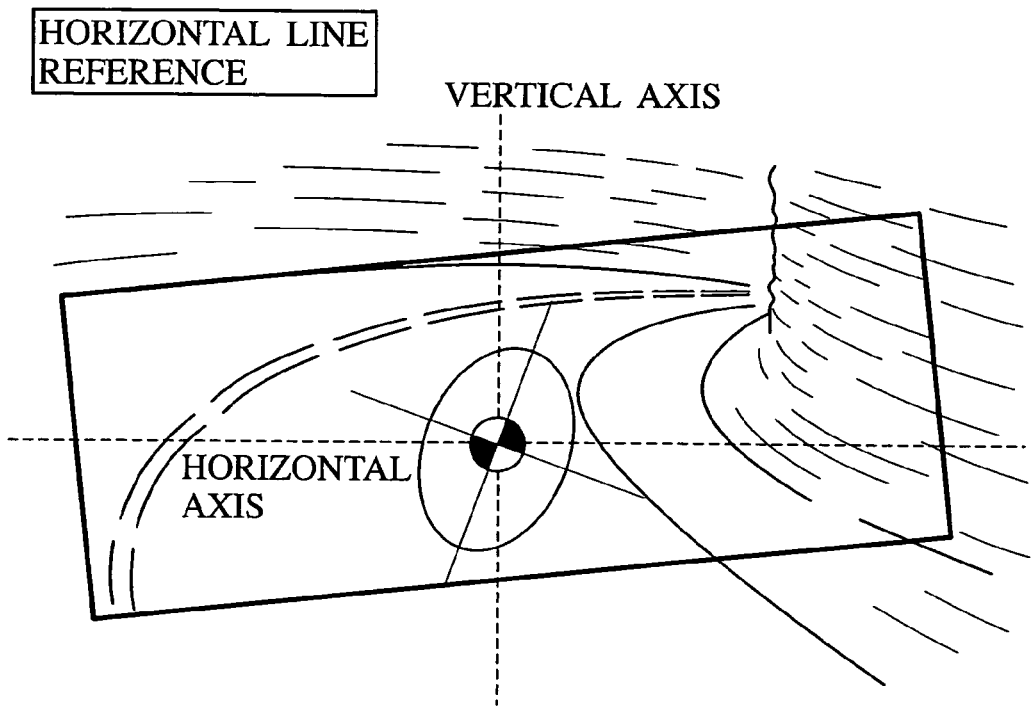
FIGS. 23A and 23B are explanatory views showing a conventional visibility of a horizontal line reference and a head coordinate reference as viewed from a windshield.
Figure 23B:
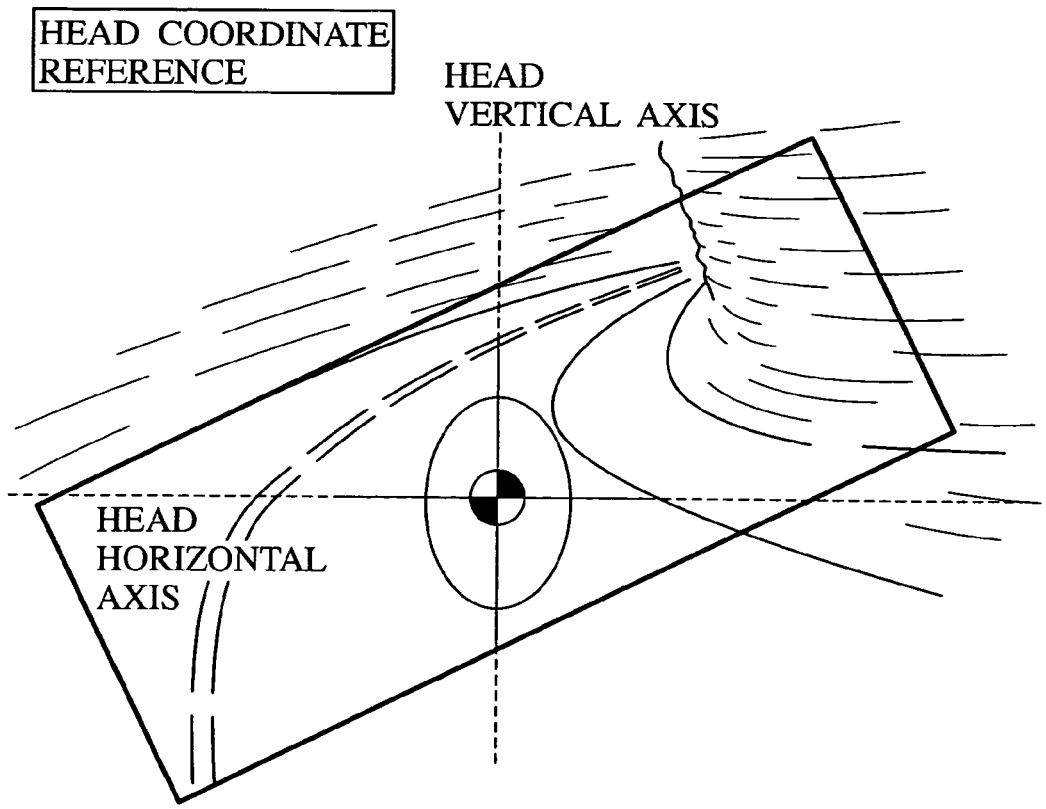

Next, a ninth embodiment of the invention will be explained. FIGS. 21 and 22 are explanatory views showing a configuration of a vehicle of the ninth embodiment.

In this embodiment, as shown in the drawings, the visibility adjusting section on the side of the passenger seat is reduced in the vehicle-width direction, and a region X between the visibility adjusting section end and the left lower end of the window frame is formed into a window frame lower end shape having a downwardly inclined angle θ.

With this configuration, it is possible to benefit, with a smaller visibility adjusting section, the same effect as the seventh embodiment in which the visibility adjusting section having the flexion on the side of the passenger seat is provided over the entire lower end of the window frame. Therefore, the area of the visibility adjusting section can further be reduced, and the stabilizing effect of the posture when the vehicle turns can be maintained.

The position T" of the end of the visibility adjusting section on the side of the passenger seat is determined based on the same idea of as that of the embodiment shown in FIGS. 16 and 17, and the length T–T" of the ridgeline connecting the apex T and the visibility adjusting section end T" to each other is set longer than the length of the lower end of the window frame connecting the visibility adjusting section end T" and the left lower end U of the window frame to each other, i.e., the length of the ridgeline T"-U. With this configuration, the same effect as that of the eighth embodiment can be obtained.

Although the lower end shape of the window frame is downwardly inclined in this embodiment, the lower end of the window frame may be upwardly inclined only if the lower end is not directed horizontally. If the lower end is upwardly inclined, it is necessary that the length T—T" of the ridgeline connecting the apex T and the visibility adjusting section end T" to each other is longer than the T"-U of the ridgeline connecting the visibility adjusting section end T" and the left lower end U of the window frame to each other.

Although the passenger seat side ridgeline of the visibility adjusting section is uniformly downwardly inclined in this embodiment, the ridgeline of the visibility adjusting section may be provided with the flexion using the method described in the seventh embodiment. That is, the flexion may be provided between the apex T and the visibility adjusting section end T" shown in FIG. 21.

In the ninth embodiment, the inclined portion between the visibility adjusting section end T" and the left lower end U of the window frame can be used instead of the ridgeline corresponding to the left side portion from the flexion T' shown in FIG. 13. Therefore, the same effect as that of the seventh embodiment can be obtained with a smaller visibility adjusting section.

That is, in forward visibility adjusting method and apparatus for providing the forward visibility with the parting line, the shape of the visibility adjusting section and the shape of the window frame lower end can be the same and the forward visibility can be provided with the parting line which is laterally inclined by forming the windshield lower end and by shielding the forward visibility. Thus, it is possible to stabilize the sense of balance of the driver, to suppress the steering disturbance and to reduce the area which shields the windshield.

The flexion is disposed at outer side from the line of vision moving range of the driver toward the passenger seat when the vehicle turns toward the passenger seat. Thus, the driver is dominantly informed of the ridgeline extending from the apex to the flexion and the apex of the visibility adjusting section. Therefore, even if there is a flexion, attention of the driver is not paid to the flexion, and the driving posture of the driver can further be stabilized.

The driver can be dominantly be informed of a ridgeline extending from the apex to the flexion or from the apex to the end of the visibility adjusting apparatus as compared with other ridgelines. Therefore, the driver's posture can be stabilized without allowing the driver to be aware of the presence of the flexion.

Although the visibility adjusting method of the vehicle of this invention has been described based on the first to ninth embodiments, the invention is not limited to these embodiments, and various changes and modifications may be made thereto without departing from the subject matter of the invention.

The entire content of a Patent Application No. TOKUGAN 2003-156980 with a filing date of Jun. 2, 2003, and a Patent Application No. TOKUGAN 2003-347046 with a filing date of Oct. 6, 2003, is hereby incorporated by reference.

What is claimed is:

1. A visibility adjusting method of a vehicle in which a windshield is provided at its lower end with a visibility adjusting section to adjust forward visibility of a driver, comprising the steps of:

disposing an apex at a position deviated from the driver and between a position opposed to the driver and a vehicle center position;

setting left and right ridgelines which uniformly downwardly incline from the apex toward opposite sides in a vehicle-width direction; and forming a visibility adjusting section by the apex and the left and right ridgelines as a parting line which adjusts a lower end visibility of the windshield.

2. The visibility adjusting method of a vehicle according to claim 1, wherein the apex is located such that a line of vision which connects the apex and a visual point of the driver is outside an outer side lane at the time of a turning position of the driver.

3. The visibility adjusting method of a vehicle according to claim 1, wherein
a maximum angle of inclination formed between a horizontal line and one of left and right ridgelines existing on the side of the driver is set greater than a roll angle of the vehicle.

4. The visibility adjusting method of a vehicle according to claim 1, wherein
the parting line of the visibility adjusting section is displaced in accordance with at least one of a vehicle orientation and a vehicle acceleration.

5. The visibility adjusting method of a vehicle according to claim 1, wherein
the visibility adjusting section comprises a shielding plate formed along a shape of a region lower than the parting line.

6. The visibility adjusting method of a vehicle according to claim 5, wherein
an adornment is formed on at least one surface of the shielding plate.

7. The visibility adjusting method of a vehicle according to claim 1, wherein
the visibility adjusting section is displayed by a plotting straight line or a plotting curve having an appropriate line width in a region lower than the parting line.

8. The visibility adjusting method of a vehicle according to claim 7, wherein
a wiper arm or a wiper blade is used in place of the plotting straight line or the plotting curve displaying the visibility adjusting section.

9. The visibility adjusting method of a vehicle according to claim 1, wherein
the visibility adjusting section includes means for clearly showing a position of the apex.

* * * * *